US 6,672,050 B2

United States Patent
Murata et al.

(10) Patent No.: US 6,672,050 B2
(45) Date of Patent: Jan. 6, 2004

(54) EXHAUST GAS PURIFICATION DEVICE OF AN ENGINE

(75) Inventors: Hiroki Murata, Toyota (JP); Toshio Suematsu, Toyota (JP); Shizuo Sasaki, Toyota (JP); Kohei Igarashi, deceased, late of Susono (JP), by Setsuko Igarashi, legal representative; Shinya Hirota, Toyota (JP); Kazuhiro Itoh, Toyota (JP); Takamitsu Asanuma, Toyota (JP); Shunsuke Toshioka, Toyota (JP); Koichi Kimura, Toyota (JP); Akira Mikami, Toyota (JP); Hiroyuki Nagareda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/232,360

(22) Filed: Sep. 3, 2002

(65) Prior Publication Data

US 2003/0066286 A1 Apr. 10, 2003

(30) Foreign Application Priority Data

Sep. 4, 2001 (JP) .......................................... 2001-267383

(51) Int. Cl.[7] .............................................. F01N 3/00
(52) U.S. Cl. .............................. 60/284; 60/278; 60/280; 60/295; 60/297; 180/65.2; 180/65.3
(58) Field of Search ..................... 60/276, 278, 280, 60/284, 285, 295, 297, 311; 180/65.2, 65.3, 65.4

(56) References Cited

U.S. PATENT DOCUMENTS

| 5,100,632 A | | 3/1992 | Dettling et al. |
|---|---|---|---|
| 5,327,992 A | * | 7/1994 | Boll .......................... 180/65.2 |
| 6,079,204 A | * | 6/2000 | Sun et al. ..................... 60/274 |
| 6,109,025 A | * | 8/2000 | Murata et al. ................ 60/297 |
| 6,422,001 B1 | * | 7/2002 | Sherman et al. .............. 60/274 |
| 6,516,609 B2 | * | 2/2003 | Igarashi et al. ............... 60/284 |

FOREIGN PATENT DOCUMENTS

| JP | B2 7-106290 | | 11/1995 |
|---|---|---|---|
| JP | 2001-164959 | * | 6/2001 |

OTHER PUBLICATIONS

Inoue, Toshio et al., "The Cleanest Car," Challenge for the Cleanest Car, Part 2: Tale Pipe Emission Reduction, Society of Automotive Engineers of Japan, Preprints No. 19–00, No. 20005–88.

* cited by examiner

Primary Examiner—Binh Tran
(74) Attorney, Agent, or Firm—Oliff & Berridge, PLC

(57) ABSTRACT

An exhaust gas purification device of an engine comprising a particulate filter arranged in an exhaust passage. An electric motor able to impart a vehicle drive power separate from the engine and able to generate electric power from the engine is provided. After the particulate filter finishes being warmed up, when the temperature of the particulate filter is low, the output torque of the engine is increased and the amount of increase of the output torque is consumed by the power generating action of the electric motor.

18 Claims, 26 Drawing Sheets

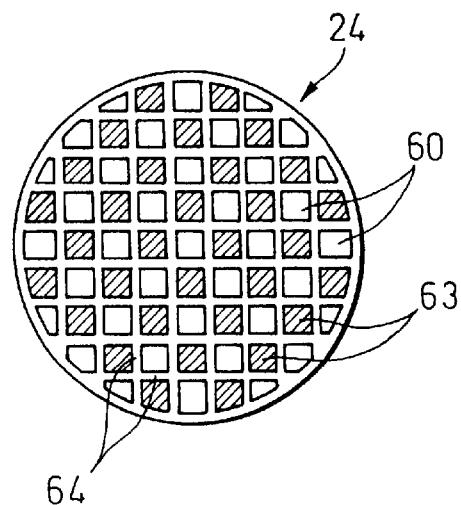
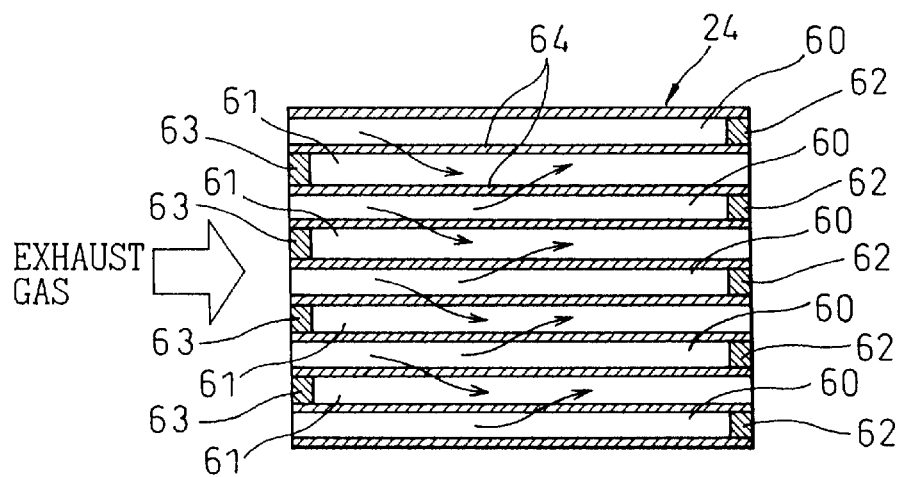

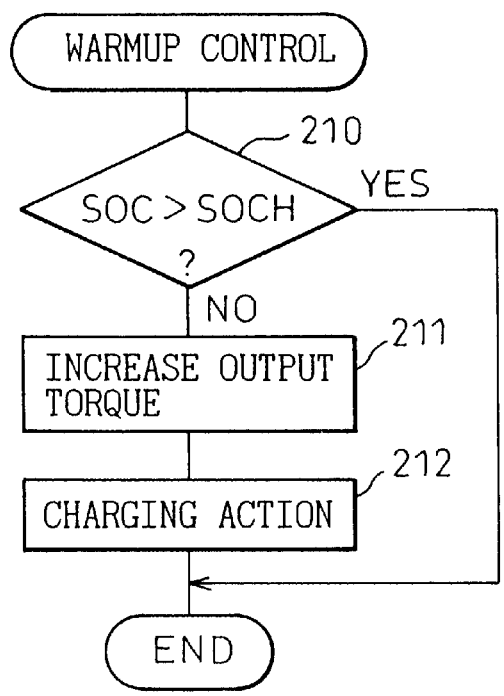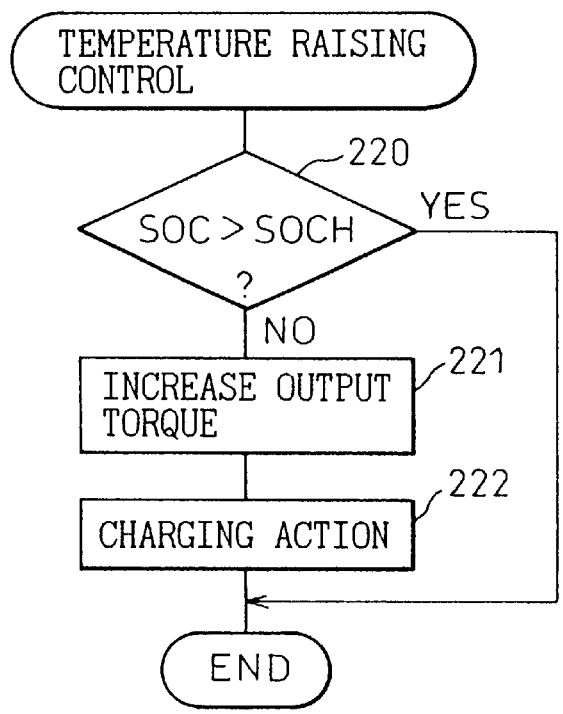

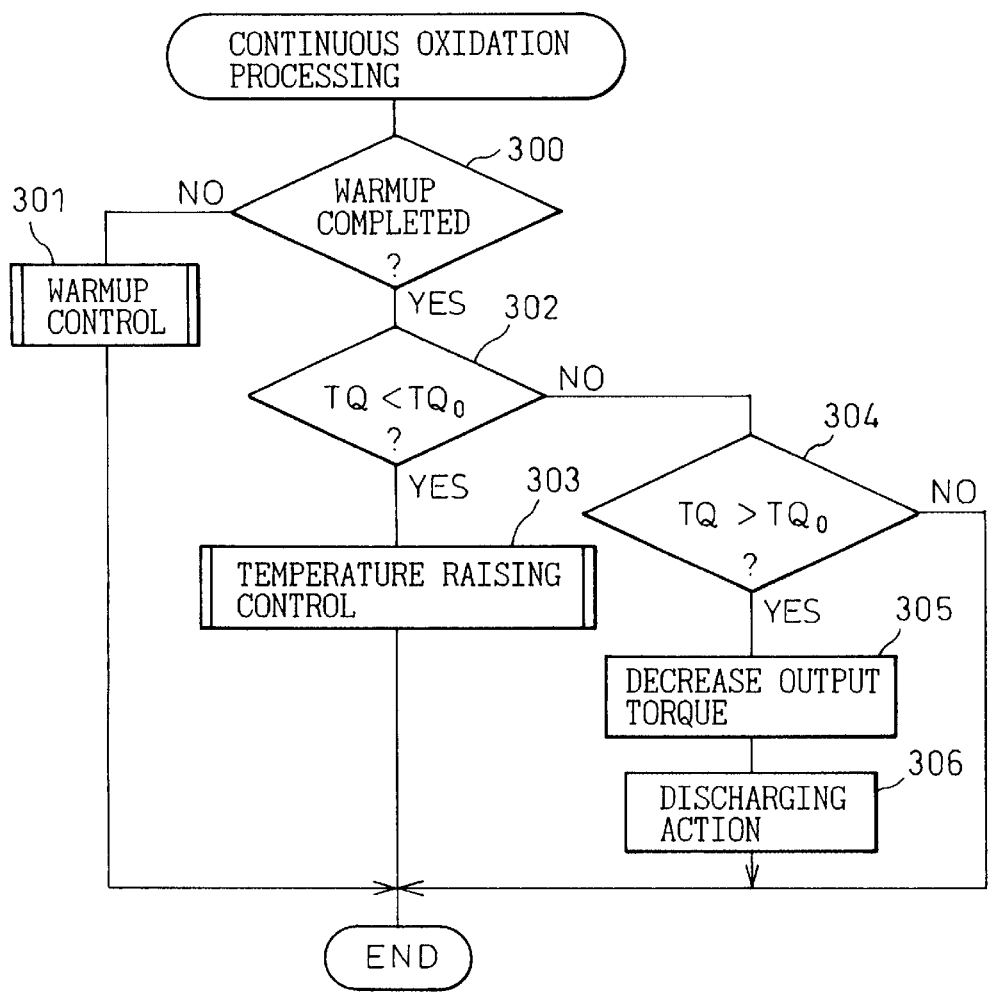

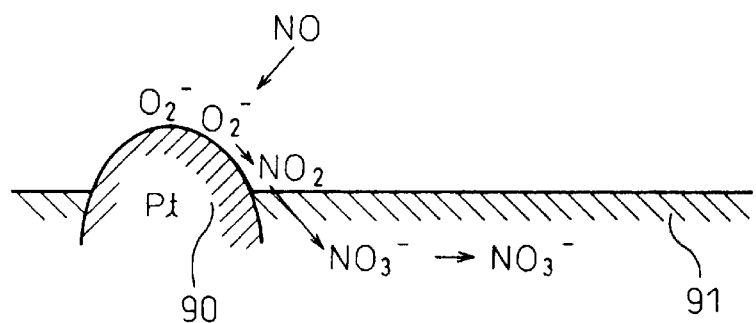
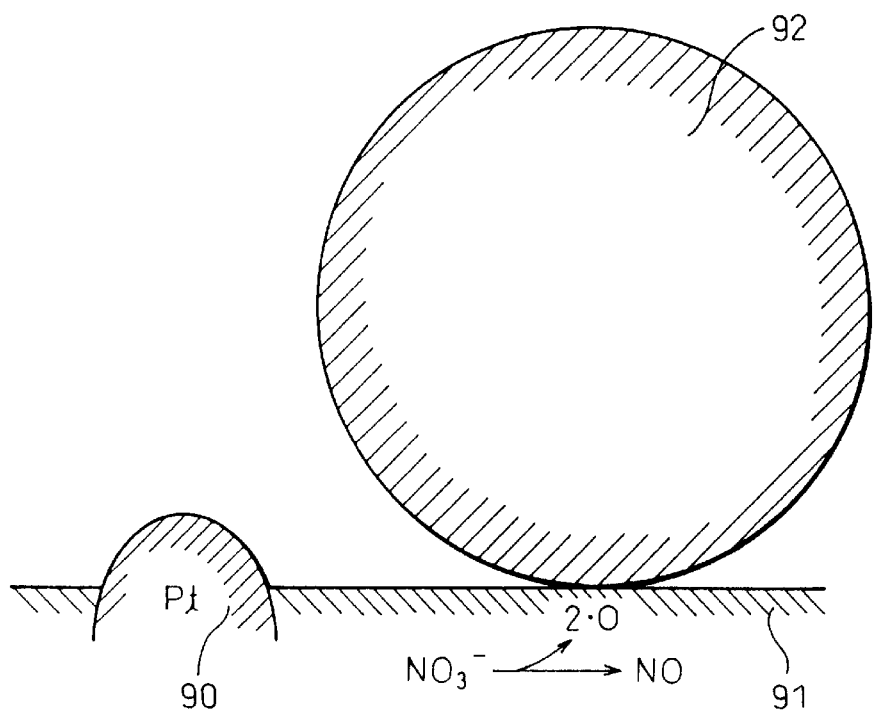

EXHAUST GAS PURIFICATION DEVICE OF AN ENGINE

BACKGROUND OF THE INVENTION

1. Field of the Invention

The present invention relates to an exhaust gas purification device of an engine.

2. Description of the Related Art

Known in the art is a vehicle provided with a so-called hybrid type power generation device designed to generate the drive power of the vehicle by a combination of an output torque of an internal combustion engine and an output torque of an electric motor, where a catalyst arranged in an engine exhaust passage is rapidly warmed by using the electric motor to the maximum extent as the drive power of the vehicle, operating the internal combustion engine independently from the running of the vehicle at that time, making the air-fuel ratio for warming the catalyst the stoichiometric air-fuel ratio, and greatly delaying the ignition timing (see "87. The Cleanest Car e no Chosen, Sono 2—Teerupaipuemisshon no Teigen" (87. Challenge of the Cleanest Car, Part 2—Reduction of Tail Pipe Emission), Society of Automotive Engineers of Japan Preprints No. 19-00, No. 20005/88.)

The internal combustion engine being used in such a vehicle is a gasoline engine. Therefore, since the temperature of the exhaust gas is high, once the catalyst is warmed, it is maintained in the warmed state during engine operation. Therefore, in this vehicle, the operation is specially controlled to warm up the catalyst only at the time of engine startup.

At the present time, however, the inventors etc. are working on the development of an exhaust gas purification device designed to continuously remove by oxidation particulate exhausted from an engine onto a particulate filter arranged in the engine exhaust passage. In this exhaust gas purification device, however, they found that the continuous oxidation removal action of particulate is only performed in a limited partial operating region of the engine operating region even after the particulate filter finishes being warmed up.

Therefore, in this exhaust gas purification device, it is necessary to specially control the operation so as to cause the oxidation removal action of the particulate to be continuously performed in order to get the particulate continuously removed by oxidation even after the particulate filter finishes being warmed up.

SUMMARY OF THE INVENTION

An object of the present invention is to provide an exhaust gas purification device designed to cause the oxidation removal action of particulate to be continuously performed as much as possible even when continuous oxidation removal action of particulate by oxidation is only performed at a partial engine operating region after the particulate filter finishes being warmed up.

According to a first aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein an electric power device able to generate vehicle drive power separate from the vehicle drive power of the engine and able to generate electric power from the engine is provided and a battery for supplying electric power for driving the vehicle to the electric power device and for being charged by the electric power generated by the electric power device is provided; and, after the particulate filter finishes being warmed up at the time of engine startup, when the temperature of the particulate filter falls below a temperature at which deposited particulate can be continuously removed by oxidation, an output torque of the engine is increased from a required torque so that the temperature of the particulate filter becomes a temperature at which deposited particulate can be continuously removed by oxidation and the amount of increase in output torque is consumed for the power generating action by the electric power device.

According to a second aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein an electric power device able to generate vehicle drive power separate from the vehicle drive power of the engine and able to generate electric power from the engine is provided and a battery for supplying electric power for driving the vehicle to the electric power device and for being charged by the electric power generated by the electric power device is provided; and, after the particulate filter finishes being warmed up at the time of engine startup, when the amount of exhausted particulate is greater than an amount of exhausted particulate at which the deposited particulate can be continuously removed by oxidation, an output torque of the engine is decreased from a required torque so that the amount of exhausted particulate becomes an amount at which the deposited particulate can be continuously removed by oxidation and the amount of decrease in output torque is compensated for by the vehicle drive power from the electric power device.

According to a third aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein after the particulate filter finishes being warmed up at the time of engine startup, at the time of steady engine operation, a continuous oxidation removal region of deposited particulate is formed in a limited partial operating region of the operating region of the engine; an electric power device able to generate vehicle drive power separate from the vehicle drive power of the engine and able to generate electric power from the engine is provided and a battery for supplying electric power for driving the vehicle to the electric power device and for being charged by the electric power generated by the electric power device is provided; and, after the particulate filter finishes being warmed up at the time of engine startup, when the output torque of the engine is lower than an output torque of the limited partial operating region, the output torque of the engine is increased from the required torque so that the output torque of the engine becomes the output torque of the limited partial operating region and the amount of increase in output torque is consumed for the power generating action of the electric power device.

According to a fourth aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein after the particulate filter finishes being warmed up at the time of engine startup, at the time of steady engine operation, a continuous oxidation removal region of deposited particulate is formed in a limited partial operating region of the operating region of the engine; an electric power device able to generate vehicle drive power separate from the vehicle drive power of the engine and able to generate electric power from the engine is provided and a battery for supplying electric power for driving the vehicle to the electric power device and for being charged by the electric power generated by the electric power device is provided; and, after the particulate filter finishes being warmed up at the time of engine startup, when the output torque of the engine is higher than an output torque of the limited partial operating region, the output torque of the engine is decreased from the required torque so that the output torque of the engine becomes the output torque of the limited partial operating region and the amount of decrease in output torque is compensated for by the vehicle drive power of the electric power device.

According to a fifth aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, and estimating means for estimating the amount of deposited particulate on the particulate filter is provided; when it is estimated by the estimating means that the amount of deposited particulate on the particulate filter has exceeded a predetermined allowable amount, when the temperature of the particulate filter is lower than a temperature at which the deposited particulate can be continuously removed by oxidation, the output torque of the engine is increased from the required torque so that the temperature of the particulate filter becomes a temperature at which the deposited particulate can be continuously removed by oxidation and the amount of increase of the output torque is consumed by the power generating action of the electric power device.

According to a sixth aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, and estimating means for estimating the amount of deposited particulate on the particulate filter is provided; when it is estimated by the estimating means that the amount of deposited particulate on the particulate filter has exceeded a predetermined allowable amount, when the amount of the exhausted particulate is larger than an amount of exhausted particulate at which the deposited particulate can be continuously removed by oxidation, the output torque of the engine is decreased from the required torque so that the amount of exhausted particulate becomes an amount at which the deposited particulate can be continuously removed by oxidation and the amount of decrease of the output torque is compensated for by the vehicle drive power of the electric power device.

According to a seventh aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein the internal combustion engine is an internal combustion engine where when an amount of inert gas in the combustion chamber increases, the amount of production of soot gradually increases and then peaks and where when further increasing the amount of inert gas in the combustion chamber, a temperature of the fuel and its surrounding gas at the time of combustion in the combustion chamber becomes lower than the temperature of production of soot and soot is no longer produced much at all; an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, estimating means for estimating the amount of deposited particulate on the particulate filter is provided, and switching means is provided for selectively switching between a first combustion where an amount of inert gas in the combustion chamber is larger than an amount of inert gas at which the amount of production of soot peaks and a second combustion where an amount of inert gas in the combustion chamber is smaller than the amount of inert gas at which the amount of production of soot peaks; and after the particulate filter finishes being warmed up, when it is estimated by the estimating means that the amount of deposited particulate on the particulate filter has exceeded a predetermined allowable amount, the second combustion is switched to the first combustion by the switching means and a torque difference between the engine output torque and the required torque is adjusted by the electric power device so that the required torque is given to the vehicle.

According to an eighth aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein the internal combustion engine is an internal combustion engine where when an amount of inert gas in the combustion chamber increases, the amount of production of soot gradually increases and then peaks and where when further increasing the amount of inert gas in the combustion chamber, a temperature of the fuel and its surrounding gas at the time of combustion in the combustion chamber becomes lower than the temperature of production of soot and soot is no longer produced much at all; an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, and switching means is provided for selectively switching between a first combustion where an amount of inert gas in the combustion chamber is larger than an amount of inert gas at which the amount of production of soot peaks and a second combustion where an amount of inert gas in the combustion chamber is smaller than the amount of inert gas at which the amount of production of soot peaks; and when a temperature of the particulate filter is lower than a temperature at which the deposited particulate can be continuously removed by oxidation and a representative value of charging expressing an amount of charging of the battery is lower than a set representative value, the output torque of the engine is increased from the required torque under the second combustion and the amount of increase of the output torque is consumed for the power generating action of the electric power device.

According to a ninth aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein the internal combustion engine is an internal combustion engine where when an amount of inert gas in the combustion chamber increases, the amount of production of soot gradually increases and then peaks and where when further increasing the amount of inert gas in the combustion chamber, a temperature of the fuel and its surrounding gas at the time of combustion in the combustion chamber becomes lower than the temperature of production of soot and soot is no longer produced much at all; an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, and switching means is provided for selectively switching between a first combustion where an amount of inert gas in the combustion chamber is larger than an amount of inert gas at which the amount of production of soot peaks and a second combustion where an amount of inert gas in the combustion chamber is smaller than the amount of inert gas at which the amount of production of soot peaks; when an amount of exhausted particulate is larger than an amount at which deposited particulate can be continuously removed by oxidation, the output torque of the engine is decreased from the required torque under the second combustion and the amount of decrease of the output torque is compensated for by the vehicle drive power of the electric power device; while when a temperature of the particulate filter becomes lower than the temperature at which the deposited particulate can be continuously removed by oxidation, the second combustion is switched to the first combustion and a torque difference between the output torque of the engine and the required torque is adjusted by the electric power device so that a required torque is given to the vehicle.

According to a 10th aspect of the present invention, there is provided an exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein the device comprises an $NO_x$ absorbent which is carried on the particulate filter, absorbs $NO_x$ when an air-fuel ratio of inflowing exhaust gas is lean, and releases the absorbed $NO_x$ when the air-fuel ratio of the inflowing exhaust gas is rich or the stoichiometric air-fuel ratio, an electric power device able to generate vehicle drive power separate from the vehicle drive power of the engine and able to generate electric power from the engine, and a battery for supplying electric power for driving the vehicle to the electric power device and for being charged by the electric power generated by the electric power device; after the particulate filter finishes being warmed up, when the temperature of the particulate filter falls below a temperature at which the deposited particulate can be continuously removed by oxidation, the output torque of the engine is increased from the required torque so that the temperature of the particulate filter becomes a temperature at which the deposited particulate can be continuously removed by oxidation and the amount of increase of the output torque is consumed for the power generating action of the electric power device; and, when $NO_x$ or $SO_x$ should be released from the $NO_x$ absorbent, the air-fuel ratio of the exhaust gas flowing into the $NO_x$ absorbent is temporarily changed from lean to rich.

BRIEF DESCRIPTION OF THE DRAWINGS

These and other objects and features of the present invention will become clearer from the following description of the preferred embodiments given with reference to the attached drawings, wherein:

FIGS. 4A and 4B are views of a particulate filter;

FIG. 10 is a flow chart for execution of warmup control;

FIG. 11 is a flow chart for execution of temperature raising control;

FIG. 12 is a flow chart for execution of a second embodiment of continuous oxidation processing for deposited particulate;

FIGS. 29A and 29B are views for explaining the oxidation action of particulate;

DESCRIPTION OF THE PREFERRED EMBODIMENTS

Preferred embodiments of the present invention will be described in detail below while referring to the attached figures.

Figure 1:
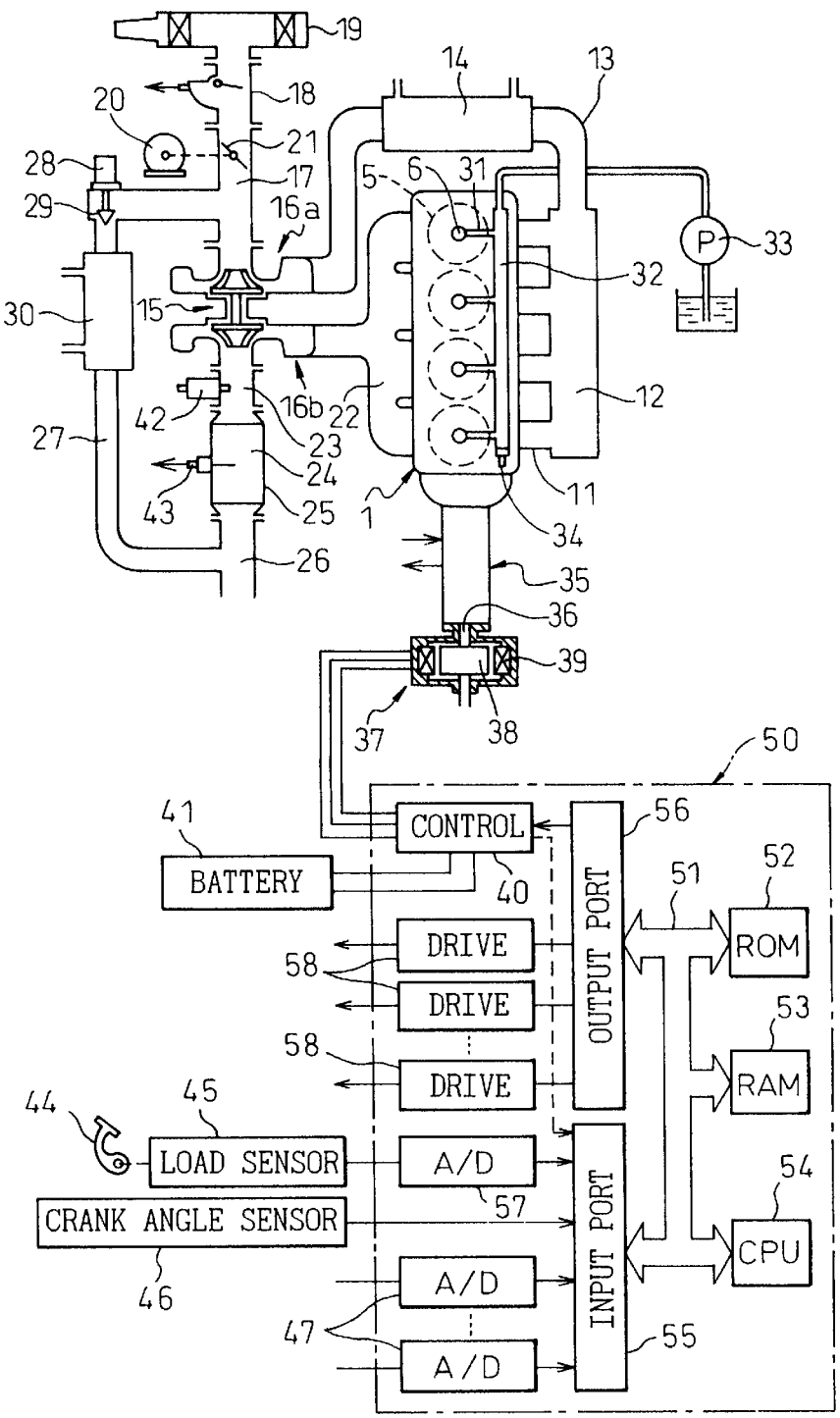
FIG. 1 is an overview of a compression-ignition type engine.
Figure 2:
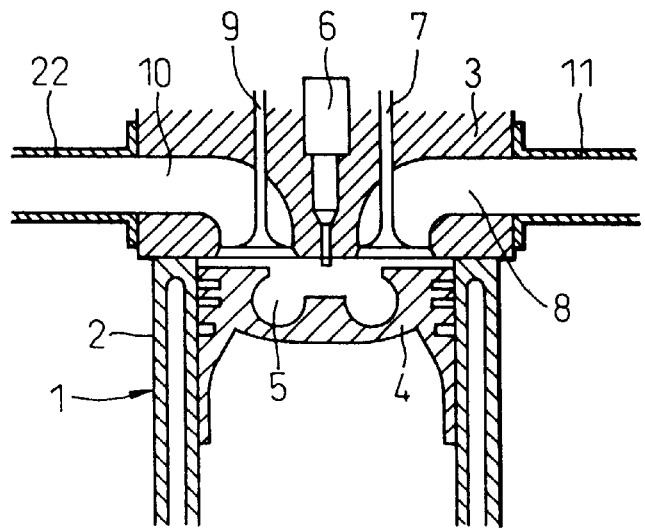
FIG. 2 is a side sectional view of an engine body.

FIG. 1 and FIG. 2 show the case of application of the present invention to a compression ignition-type internal combustion engine of the cylinder injection type, but the present invention can also be applied to a spark ignition-type internal combustion engine of the cylinder injection type.

Referring to FIG. 1 and FIG. 2, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake tube 11, while the surge tank 12 is connected to an outlet of a compressor 16a of a supercharger, for example, an exhaust turbocharger 15, through an intake duct 13 and intercooler 14. The inlet of the compressor 16a is connected to an air cleaner 19 through an intake duct 17 and air flow meter 18. Inside the intake duct 13 is arranged a throttle valve 21 driven by a step motor 20.

On the other hand, the exhaust port 10 is connected to an inlet of an exhaust turbine 16b of an exhaust turbocharger 15 through an exhaust manifold 22. The outlet of the exhaust turbine 16b is connected to a casing 25 housing a particulate filter 24 through an exhaust pipe 23. The exhaust pipe 26 downstream of the casing 25 and the intake duct 17 downstream of the throttle valve 21 are connected to each other through an exhaust gas recirculation (EGR) passage 27. The EGR passage 27 has arranged inside it an EGR control valve 29 driven by a step motor 28. Further, the EGR passage 27 has arranged inside it an EGR cooler 30 for cooling the EGR gas circulating inside the EGR passage 27. In the embodiment shown in FIG. 1, the engine coolant water is guided inside the EGR cooler 30 and the EGR gas is cooled by the engine coolant water.

On the other hand, fuel injectors 6 are connected to a fuel reservoir, a so-called common rail 32, through fuel feed pipes 31. Fuel is fed into the common rail 32 from an electrically controlled variable discharge fuel pump 33. The fuel fed into the common rail 32 is fed to the fuel injectors 6 through the fuel feed pipes 31. The common rail 32 has a fuel pressure sensor 34 attached to it for detecting the fuel pressure in the common rail 32. The discharge of the fuel pump 33 is controlled based on the output signal of the fuel pressure sensor 34 so that the fuel pressure in the common rail 32 becomes a target fuel pressure.

On the other hand, in the embodiment shown in FIG. 1, a transmission 35 is connected to the output shaft of the engine, while an electric motor 37 is connected to the output shaft 36 of the transmission 35. In this case, as the transmission 35, a usual noncontinuous automatic transmission provided with a torque converter, manual transmission, noncontinuous automatic transmission of a type designed to automatically perform the clutch operation and shifting operation in a manual transmission provided with a clutch, etc. may be used.

Further, the electric motor 37 connected to the output shaft 36 of the transmission 35 forms an electric power device able to generate vehicle drive power separate from the vehicle drive power of the engine and able to generate electric power from the engine. In the embodiment shown in FIG. 1, this electric motor 37 is comprised of an AC synchronous motor provided with a rotor 38 attached to the output shaft 36 of the transmission 35 and having a plurality of permanent magnets attached to its outer circumference and a stator 39 comprised of an excitation coil forming a rotating magnetic field. The excitation coil of the stator 39 is connected to a motor drive control circuit 40. This motor drive control circuit 40 is connected to a battery 41 generating a DC high voltage.

An electronic control unit 50 is comprised of a digital computer provided with a read only memory (ROM) 52, random access memory (RAM) 53, microprocessor (CPU) 54, input port 55, and output port 56 connected to each other through a bidirectional bus 51. The output signals of the air flow meter 18 and fuel pressure sensor 34 are input through corresponding AD converters 57 to the input port 55. Further, the casing 25 housing the particulate filter 24 has attached to it a temperature sensor 43 for detecting the temperature of the particulate filter 24. The output signal of this temperature sensor 43 is input to the input port 55 through the corresponding AD converter 57. Note that it is also possible not to provide this temperature sensor 43, but to estimate the temperature of the particulate filter 24 using a model showing the relationship between the operating state of the engine and the temperature of the particulate filter 24. Further, the input port 55 receives as input various signals expressing the speed of the transmission 35, the rotational speed of the output shaft 36, etc.

On the other hand, an accelerator pedal 44 has connected to it a load sensor 45 generating an output voltage proportional to the amount of depression L of the accelerator pedal 44. The output voltage of the load sensor 45 is input to the input port 55 through the corresponding AD converter 57. Further, the input port 55 has connected to it a crank angle sensor 46 generating an output pulse each time a crankshaft rotates by for example 10 degrees. On the other hand, the inlet of the casing 25 carrying the particulate filter 24 is provided with a hydrocarbon feed valve 42 for feeding hydrocarbons, for example, fuel, in the exhaust gas. The output port 56 is connected to the fuel injectors 6, step motor 20, EGR control valve 28, fuel pump 33, transmission 35, motor drive control circuit 40, and hydrocarbon feed valve 42 through the corresponding drive circuits 58.

The supply of the electric power to the excitation coil of the stator 39 of the electric motor 37 is usually stopped. At that time, the rotor 38 turns along with the output shaft 36 of the transmission 37. On the other hand, when driving the electric motor 37, the DC high voltage of the battery 41 is converted to a three-phase AC of a frequency fm and current Im at the motor control circuit 40. This three-phase AC is supplied to the excitation coil of the stator 39. The frequency fm is the frequency necessary for making the rotating magnetic field generated by the excitation coil rotate synchronously with the rotation of the rotor 38. This frequency fm is calculated by the CPU 54 based on the speed of the output shaft 36. In the motor drive control circuit 40, the frequency fm is made the frequency of this three-phase AC.

On the other hand, the output torque of the electric motor 37 is substantially proportional to the current value Im of the three-phase AC. In the motor drive control circuit 40, this current value Im is made the current value of the three-phase AC.

Further, if setting a state where the electric motor 37 is driven by external force, the electric motor 37 acts as a generator. The electric power generated at this time is recovered by the battery 41. Whether the electric motor 37 is to be driven by external force is judged by the CPU 54. When it is judged that the electric motor 37 should be driven by external force, the motor control circuit 40 controls the system so that the electric power generated by the electric motor 37 is recovered by the battery 41.

Figure 3:
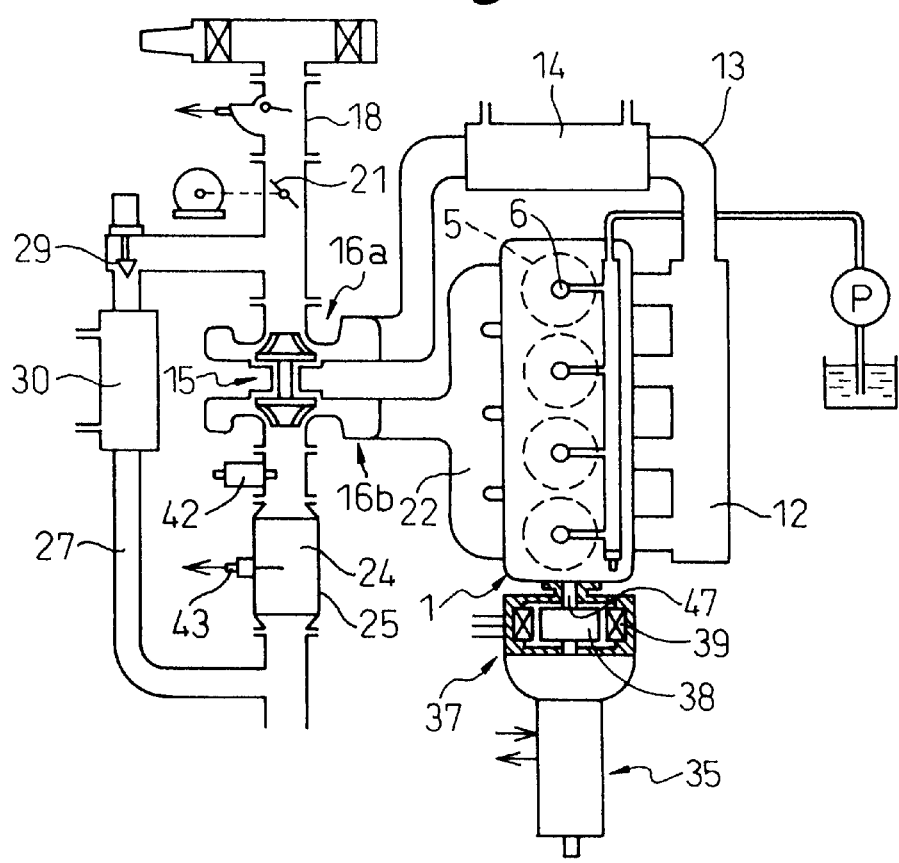
FIG. 3 is an overview of another embodiment of a compression-ignition type engine.

FIG. 3 shows another embodiment of a compression ignition type engine. In this embodiment, the electric motor 37 is connected to the output shaft 47 of the engine, while the transmission 35 is connected to the output shaft of the electric motor 37. In this embodiment, the rotor 38 of the electric motor 37 is attached to the output shaft 47 of the engine. Therefore, the rotor 38 rotates along with the output shaft 47 of the engine at all times. Further, in this embodiment as well, as the transmission 35, a usual noncontinuous automatic transmission provided with a torque converter, manual transmission, noncontinuous automatic transmission of a type designed to automatically perform the clutch operation and shifting operation in a manual transmission provided with a clutch, etc. may be used.

FIGS. 4A and 4B show the structure of the particulate filter 24 housed in the casing 25 in FIG. 1 and FIG. 3. Note that FIG. 4A is a front view of the particulate filter 22, while FIG. 4B is a side sectional view of the particulate filter 24. As shown in FIGS. 4A and 4B, the particulate filter 24 forms a honeycomb structure and is provided with a plurality of exhaust passage pipes 60 and 61 extending in parallel with each other. These exhaust passage pipes are comprised by exhaust gas inflow passages 60 with downstream ends sealed by plugs 62 and exhaust gas outflow passages 61 with upstream ends sealed by plugs 63. Note that the hatched portions in FIG. 4A show plugs 63. Therefore, the exhaust gas inflow passages 60 and the exhaust gas outflow passages 61 are arranged alternately through thin wall partitions 64. In other words, the exhaust gas inflow passages 60 and the exhaust gas outflow passages 61 are arranged so that each exhaust gas inflow passage 60 is surrounded by four exhaust gas outflow passages 61, and each exhaust gas outflow passage 61 is surrounded by four exhaust gas inflow passages 60.

The particulate filter 24 is formed from a porous material such as for example cordierite. Therefore, the exhaust gas flowing into the exhaust gas inflow passages 60 flows out into the adjoining exhaust gas outflow passages 61 through the surrounding partitions 64 as shown by the arrows in FIG. 4B. Note that, in this embodiment of the present invention, a layer of a carrier comprised of for example alumina is formed on the peripheral surfaces of the exhaust gas inflow passages 60 and the exhaust gas outflow passages 61, that is, the two side surfaces of the partitions 64 and the inside walls of the fine holes in the partitions 64. On the carrier are carried platinum Pt or another precious metal catalyst.

Particulate comprised of mainly carbon C is produced in the combustion chamber 5. Therefore, the exhaust gas contains this particulate. The particulate contained in the exhaust gas is trapped on the particulate filter 24 when the exhaust gas is flowing through the exhaust gas inflow passages 60 of the particulate filter 24 or when heading from the exhaust gas inflow passages 60 to the exhaust gas outflow passages 61. When the temperature of the particulate filter 24 becomes higher and the amount of particulate in the exhaust gas is not that large, the particulate trapped on the particulate filter 24 is oxidized, without emitting a luminous flame, for several minutes to several tens of minutes. On the other hand, while the particulate is being oxidized in this way, other particulate is successively depositing on the particulate filter 24. Therefore, in practice, a certain amount of particulate is always depositing on the particulate filter 24. Part of this depositing particulate is removed by oxidation. In this way, the particulate deposited on the particulate filter 24 is continuously burned without emitting a luminous flame.

When a large amount of particulate deposits on the particulate filter 22, the deposited particulate gradually changes to oxidation resistant carbon and the changed particulate continues to be deposited without being removed by oxidation. In this case as well, if possible to make the particulate filter 24 a high temperature, the deposited particulate burns along with a flame and the surface of the particulate filter 24 becomes red hot.

As opposed to this, in the present invention, the particulate is oxidized without emitting a luminous flame as explained above. At this time, the surface of the particulate filter 24 does not become red hot. That is, in other words, in the present invention, the particulate is removed by oxidation by a considerably low temperature. Accordingly, the action of removal of the particulate by oxidation without emitting a luminous flame according to the present invention is completely different from the action of removal of particulate by burning accompanied with a flame.

A precious metal catalyst becomes more active the higher the temperature of the particulate filter 24, so the particulate becomes more easily removed by oxidation the higher the temperature of the particulate filter 24. Therefore, the amount of the particulate removable by oxidation on the particulate filter 24 per unit time without emitting a luminous flame increases the higher the temperature of the particulate filter 24.

Figure 5:
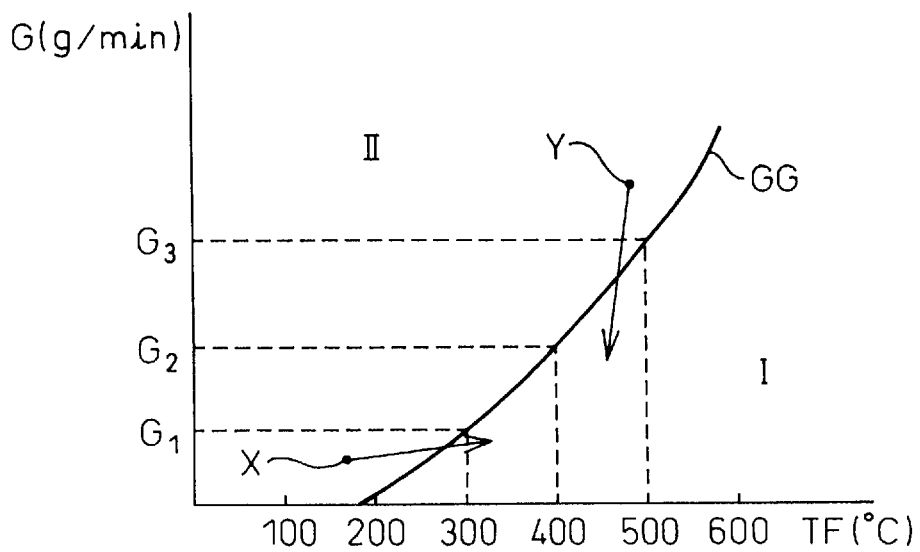
FIG. 5 is a view of the relationship between the amount of particulate removable by oxidation and the temperature of the particulate filter.

The solid line GG in FIG. 5 shows the relationship between the speed of oxidation of the particulate on the particulate filter 24, that is, the amount of particulate removable by oxidation without emitting a luminous flame per minute (g/min), and the temperature TF of the particulate filter 24. That is, the curve GG shown in FIG. 5 shows the balance point where the amount of particulate flowing into the particulate filter 24, that is, the amount of exhausted particulate exhausted from the engine, matches with the amount of particulate removable by oxidation. On this curve GG, since the amount of exhausted particulate and the amount of particulate removed by oxidation are equal, the amount of the deposited particulate on the particulate filter 24 is maintained constant. On the other hand, in a region I of FIG. 5, the amount of exhausted particulate is smaller than the amount of particulate removable by oxidation. Therefore, if the state of the region I continues, the amount of the deposited particulate gradually becomes smaller. As opposed to this, in a region II of FIG. 5, the amount of exhausted particulate becomes greater than the amount of particulate removable by oxidation. Therefore, all of the exhausted particulate can no longer be oxidized, so if the state of the region II continues, the amount of the deposited particulate gradually increases. In this case, the deposited particulate gradually changes to oxidation-resistant carbon along with the elapse of time from deposition. Therefore, if the state of the region II continues, the deposited particulate gradually becomes harder to oxidize.

In this way, if the particulate filter 24 according to the present invention is used, when the amount of exhausted particulate and the amount of particulate removable by oxidation are equal (on curve GG of FIG. 5) and when the exhausted particulate becomes smaller than the amount of particulate removable by oxidation (region I of FIG. 5), the particulate deposited on the particulate filter 24 is successively removed by oxidation. That is, the deposited particulate is continuously oxidized. As opposed to this, even when the amount of exhausted particulate is greater than the amount of particulate removable by oxidation (region II of FIG. 5), part of the deposited particulate is continuously oxidized, but part of the deposited particulate is deposited without being oxidized. Therefore, if the state where the amount of exhausted particulate is greater than the amount of oxidized particulate continues, the amount of deposited particulate gradually increases. In this way, even in the region II, part of the deposited particulate is continuously oxidized, but in the present invention, the region I where all of the deposited particulate is successively removed by oxidation (including the solid line GG) is called the continuous oxidation removal region of deposited particulate.

The continuous oxidation removal region of the deposited particulate is determined from the temperature TF of the particulate filter 24 and the amount G of the exhausted particulate. In FIG. 5, when the temperature TF of the particulate filter 24 is 300° C., the time when the amount of exhausted particulate is $G_1$ or smaller than $G_1$ becomes the continuous oxidation removal region of the deposited particulate, when the temperature TF of the particulate filter 24 is 400° C., the time when the amount of exhausted particulate is $G_2$ or smaller than $G_2$ becomes the continuous oxidation removal region of the deposited particulate, while when the temperature TF of the particulate filter 24 is 500° C., the time when the amount of exhausted particulate is $G_3$ or smaller than $G_3$ becomes the continuous oxidation removal region of the deposited particulate.

Figure 6:
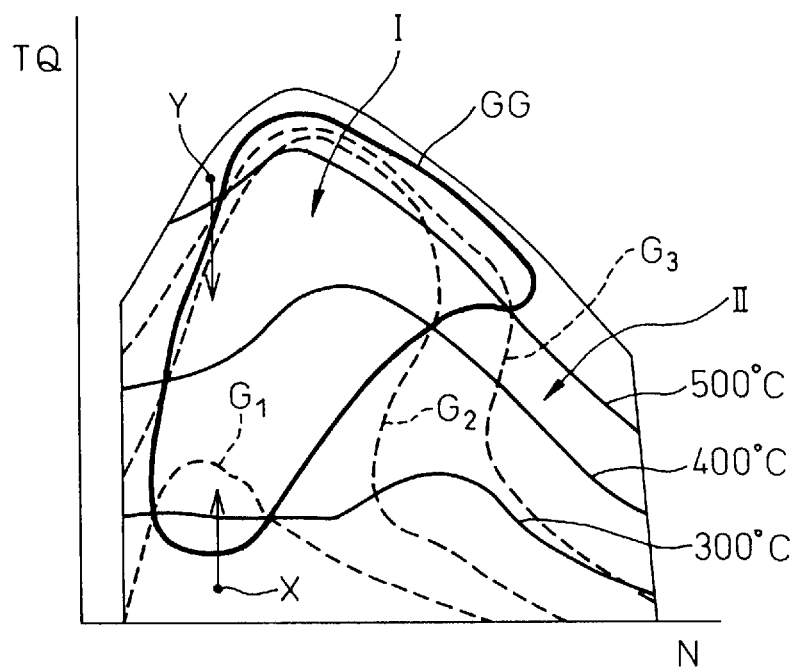
FIG. 6 is a view of a continuous oxidation removal region.

On the other hand, in the interval until the particulate filter 24 finishes being warmed up after startup of the engine, the temperature TF of the particulate filter 24 gradually rises, but if the particulate filter 24 finishes being warmed up, the temperature TF of the particulate filter 24 enters the engine operating state, that is, a temperature in accordance with the engine output torque and engine speed. Further, at this time, the amount G of the exhausted particulate becomes an amount corresponding to the engine operating state, that is, the engine output torque and engine speed. FIG. 6 shows the temperature TF of the particulate filter 24 and amount G of exhausted particulate determined in accordance with the engine output torque TQ and engine speed N at the time of steady state operation after the particulate filter 24 finishes being warmed up in the engine shown in FIG. 1. Note that FIG. 6 shows the 300° C., 400° C., and 500° C. shown in FIG. 5 as representative values of the temperature TF of the particulate filter 24 and $G_1$, $G_2$, and $G_3$ shown in FIG. 5 as representative values of the amount G of exhausted particulate.

In FIG. 6, the bold solid line GG shows the line connecting the intersection of TF=300° C. and G1, the intersection of TF=400° C. and G2, and the intersection of TF=500° C. and G3, that is, the line corresponding to the solid line GG shown in FIG. 5. That is, the bold solid line GG in FIG. 6 shows the balance point where the amount of exhausted particulate matches with the amount of particulate removable by oxidation. The region I surrounded by this bold solid line GG corresponds to the region I of FIG. 5 where the amount of exhausted particulate is smaller than the amount of particulate removable by oxidation, while the region II at the outside of the solid bold line GG corresponds to the region II of FIG. 5. Therefore, in the engine shown in FIG. 1, the region I on the solid line GG and surrounded by the solid line GG becomes the continuous oxidation removal region in FIG. 6.

Figure 7:
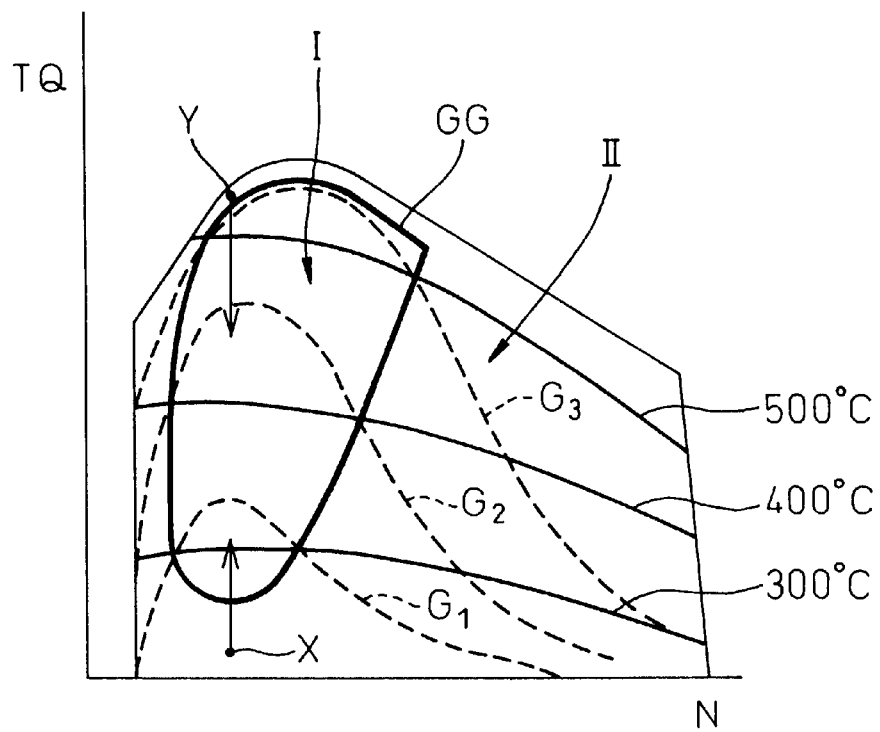
FIG. 7 is a view of a continuous oxidation removal region.

The engine shown in FIG. 1 is provided with an exhaust turbocharger 15. Therefore, FIG. 6 shows the case where a supercharging action is performed by the exhaust turbocharger 15. As opposed to this, FIG. 7 shows the temperature TF (300° C., 400° C., 500° C.) of the particulate filter 24, the amounts of exhausted particulate ($G_1$, $G_2$, $G_3$), the balance point GG, and the region I and region II in the case of no supercharging action by the exhaust turbocharger. If a supercharging action by the exhaust turbocharger is performed, the amount of air increases, so the amount G of exhausted particulate falls and the temperature TF of the particulate filter 24 becomes lower. Therefore, as will be understood if comparing FIG. 6 and FIG. 7, when a supercharging action by the exhaust turbocharger is performed, at the time of engine medium-speed and medium- or high-load operation, the line showing the same particulate filter temperature and the line showing the same amount of exhausted particulate become at the high output torque TQ side more in the case shown in FIG. 6 than in the case shown in FIG. 7.

As shown in FIG. 6 and FIG. 7, in both the cases shown in FIG. 6 and FIG. 7, the continuous oxidation removal region GG and I of the deposited particulate is formed at a partial operating region of the engine operating region at the time of steady operation after the particulate filter 24 finishes being warmed up. At the low output torque TQ side of the continuous oxidation removal region GG and I in FIG. 6 and FIG. 7, whether the particulate filter 24 is not activated or activated, the amount of exhausted particulate is larger than the amount of particulate removable by oxidation, so the region II is entered. On the other hand, at the high output torque TQ side of the continuous oxidation removal region GG and I in FIG. 6 and FIG. 7, that is, in the full load or high load operating region, the particulate filter 24 is activated, but is near the smoke limit, so the amount of exhausted particulate becomes larger than the amount of particulate removable by oxidation and therefore the region II is entered.

Now, after the particulate filter 24 finishes being warmed up at the time of engine startup, so long as the engine operating state is maintained in the continuous oxidation removal region GG and I, all of the deposited particulate on the particulate filter 24 is successively removed by oxidation. At this time, when the engine operating state is not in the continuous oxidation removal region GG and I as shown by X or Y in FIG. 5 to FIG. 7, all of the deposited particulate can no longer be successively removed by oxidation. Therefore, in the present invention, to get all of the deposited particulate successively removed by oxidation, when the engine operating state is not in the continuous oxidation removal region GG and I as shown by X or Y of FIG. 5 to FIG. 7, the electric motor 37 is made to act to generate power or the electric motor 37 is made to generate vehicle drive power so as to change the engine operating state as shown by the arrow marks of FIG. 5 to FIG. 7 and thereby the engine is made to operate in the continuous oxidation removal region GG and I.

Note that when the electric motor 37 is made to generate power, the generated electric power is charged in the battery 41. The electric power charged in the battery 41 is discharged to make the electric motor 37 generate vehicle drive power. That is, when causing the electric motor 37 to generate electric power or causing the electric motor 37 to generate vehicle drive power, the battery 41 is charged or discharged. The charging/discharging action of the battery 41 is performed considering a representative value SOC showing the amount of charging of the battery 41. As the representative value SOC of the charging, the ratio of the actual amount of charged energy to the battery capacity, that is, the maximum amount of charged energy, or the actual amount of charging itself, is used. That is, if the upper limit where the representative value SOC of the charging of the battery 41 becomes overcharging is exceeded, the charging action of the battery 41 is prohibited. If the representative value SOC of charging of the battery 41 falls below the lower limit where a sufficient discharging current can be supplied, the discharging action of the battery 41 is prohibited.

Figure 8:
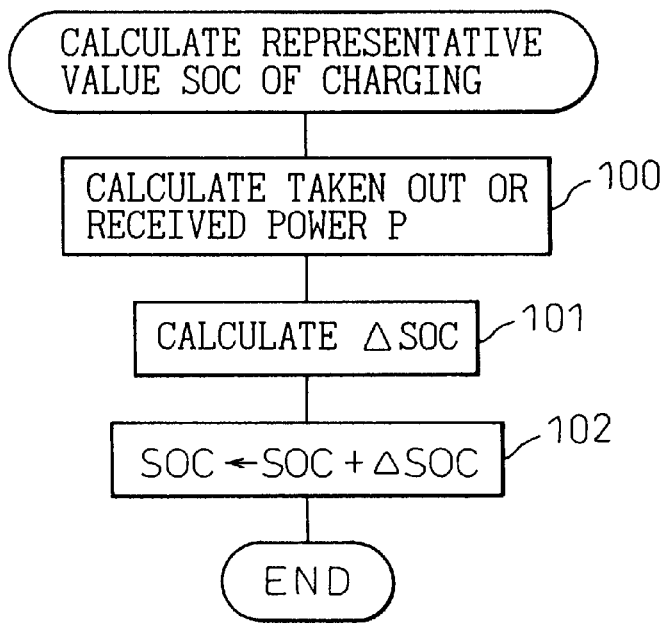
FIG. 8 is a flow chart for calculating a representative value of charging of a battery.

In this embodiment of the present invention, as shown by the broken line in FIG. 1, the signals showing the charging current, discharging current, and voltage of the battery 41 are input from the motor drive control circuit 40 to the input port 55 and the representative value SOC of charging showing the ratio of the actual amount of charged energy to the battery capacity is calculated in the routine shown in FIG. 8. That is, referring to FIG. 8, at step 100, the electric power P taken out per unit time from the battery 41 or the electric power P received in the battery 41 per unit time is calculated from the battery 41 based on the discharging/discharging current value and the voltage of the battery 41. Next, at step 101, the electric power P is subtracted from the battery capacity and the result made $\Delta$SOC. Next, at step 102, this $\Delta$SOC is added to the SOC, whereby the representative value SOC of charging is calculated. Note that when calculating the representative value SOC of charging, if considering the temperature of the battery 41, it is possible to obtain a representative value SOC of charging more accurately expressing the ratio of the actual charged energy to the battery capacity.

Next, embodiments of the present invention will be successively explained.

In the first embodiment of the present invention, before the particulate filter 24 finishes being warmed up at the time of engine startup, the output torque TQ of the engine is increased from the required torque, and the amount of increase in the output torque TQ is made to be consumed for the power generating action of the electric motor 37. That is, before the particulate filter 24 finishes being warmed up, the output torque TQ of the engine is increased, whereby the particulate filter 24 is rapidly warmed up. On the other hand, at this time, the amount of increase in the output torque TQ is consumed for the power generating action of the electric motor 37 so that the required torque is applied to the vehicle. The battery 41 is charged by the power generated at this time.

Further, in the first embodiment, after the particulate filter 24 finishes being warmed up at the time of engine startup, when the temperature TF of the particulate filter 24 falls below a temperature at which deposited particulate can be continuously removed by oxidation, that is, when the temperature TF of the particulate filter 24 falls below a temperature on the balance point GG determined from the amount G of exhausted particulate as shown by x in FIG. 6 and FIG. 7, the output torque TQ of the engine is increased from the required torque so that the temperature of the particulate filter 24 becomes a temperature at which deposited particulate can be continuously removed by oxidation, that is, so that the engine operating state becomes the continuous oxidation removal region GG and I shown in FIG. 6 and FIG. 7. The amount of increase in the output torque is made to be consumed for the power generating action of the electric motor 37.

That is, after the particulate filter 24 finishes being warmed up, when the temperature TF of the particulate filter 24 falls below a temperature at which deposited particulate can be continuously removed by oxidation, the engine output torque TQ is increased so that all of the deposited particulate can be successively removed by oxidation. On the other hand, at this time, the amount of increase in the output torque TQ is consumed for the power generating action of the electric motor 37 so that the required torque is applied to the vehicle. The battery 41 is charged by the power generated at that time.

Further, in the first embodiment, after the particulate filter 24 finishes being warmed up at the time of engine startup, when the amount of exhausted particulate is larger than an amount of exhausted particulate at which deposited particulate can be continuously removed by oxidation, that is, when the amount of exhausted particulate is larger than an amount of exhausted particulate on the balance point GG determined from the temperature TF of the particulate filter 24 as shown by Y at FIG. 6 and FIG. 7, the output torque TQ of the engine is decreased from the required torque so that the amount G of the exhausted particulate becomes an amount at which deposited particulate can be continuously removed by oxidation, that is, the engine operating state becomes within the continuous oxidation removal region GG and 1 shown in FIG. 6 and FIG. 7, and the amount of decrease of the output torque TQ is compensated for by the vehicle drive power of the electric motor 37.

That is, after the particulate filter 24 finishes being warmed up, when the amount of exhausted particulate is larger than an amount of exhaust at which deposited particulate can be continuously removed by oxidation, the output torque TQ of the engine is made to be decreased so that all of the deposited particulate is made to be successively removed by oxidation. On the other hand, at this time, the amount of decrease of the output torque TQ is compensated for by the vehicle drive power of the electric motor 37.

Figure 9:
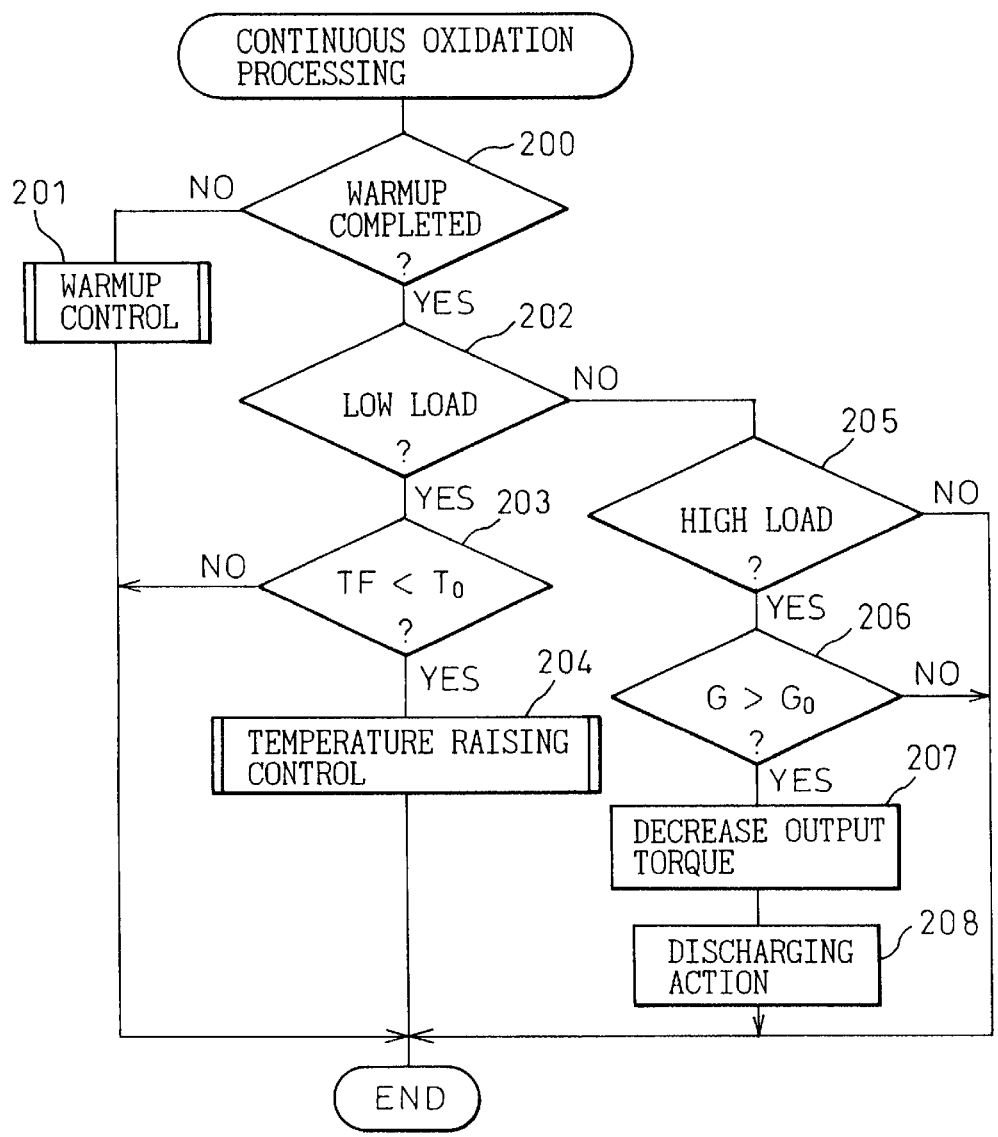
FIG. 9 is a flow chart for execution of a first embodiment of continuous oxidation processing for deposited particulate.

FIG. 9 shows the processing routine for continuous oxidation for working the first embodiment.

Referring to FIG. 9, first, at step 200, it is judged if the particulate filter 24 has finished being warmed up at the time of engine startup. When the particulate filter 24 has not finished being warmed up, at step 201, control is performed for warmup of the particulate filter 24 at the time of engine startup.

This warmup control is shown in FIG. 10. Referring to FIG. 10, at step 210, it is judged if an upper limit SOCH beyond which a representative value SOC of charging of the battery 41 becomes overcharging has been exceeded. When SOC≦SOCH, the routine proceeds to step 211, where the engine output torque TQ is made to be increased with respect to the required torque for rapidly warming up the particulate filter 24. Next, at step 212, the motor control circuit 40 is made to operate so that the amount of increase in the output torque TQ is consumed by the power generating action of the electric motor 37 and the battery 41 is charged by the electric power generated at that time. As opposed to this, when SOC>SOCH, there is no action for increasing the engine output torque TQ and no action for generating electric power by the electric motor 37.

On the other hand, when it is judged that the particulate filter 24 has finished being warmed up at step 200 of FIG. 9, the routine proceeds to step 202, where it is judged if the engine is operating under low load. When the engine is operating under low load, the routine proceeds to step 203, where it is judged if the temperature TF of the particulate filter 24 detected by the temperature sensor 43 is lower than a temperature $T_O$ at which the deposited particulate can be continuously removed by oxidation. When TF<$T_O$, the routine proceeds to step 204, where control is performed to raise the temperature.

This temperature raising control is shown in FIG. 11. Referring to FIG. 11, at step 220, it is judged if the upper limit SOCH at which the representative valve SOC of charging the battery 41 becomes overcharging has been exceeded. When SOC≦SOCH, the routine proceeds to step 221, where the engine output torque TQ is made to be increased with respect to the required torque so that the engine operating state becomes the continuous oxidation removal region GG and I shown in FIG. 5 to FIG. 7. Next, at step 222, the motor control circuit 40 is made to operate so that the amount of increase in the output torque TQ is consumed by the power generating action of the electric motor 37. The battery 41 is charged by the power generated at this time. As opposed to this, when SOC>SOCH, there is no action for increasing the engine output torque TQ and no action for generating electric power by the electric motor 37.

On the other hand, when it is judged that the engine is not operating at low load at step 202 of FIG. 9, the routine proceeds to step 205, where it is judged if the engine is operating under high load. When it is operating under high load, the routine proceeds to step 206, where it is judged if the amount G of exhausted particulate is larger than an amount $G_O$ of particulate removable by oxidation. When G>$G_O$, the routine proceeds to step 207, where the engine output torque TQ is made to be decreased from the required torque so that the amount becomes the continuous oxidation removal region GG and I shown in FIG. 5 to FIG. 7. Next, at step 208, the motor control circuit 40 is made to operate so that the amount of decrease in the output torque matches with the vehicle drive power of the electric motor 37. At this time, the battery 41 is discharged.

Next, a second embodiment of the present invention will be explained.

As already explained referring to FIG. 6 and FIG. 7, after the particulate filter 24 finishes being warmed up after engine startup, the continuous oxidation removal region GG and I of the deposited particulate is formed at a limited partial operating region of the engine operating region at the time of engine steady operation. Therefore, in the second embodiment, after the particulate filter 24 finishes being warmed up at the time of engine startup when the engine output torque TQ is lower than the output torque of the limited partial operating region as shown by X in FIG. 6 and FIG. 7, the engine output torque TQ is increased from the required torque so that the engine output torque TQ becomes the output torque of the limited partial operating region and the amount of increase in the output torque TQ is consumed for the power generating action of the electric motor 37.

That is, when engine output torque TQ falls below an engine output torque at which deposited particulate can be continuously removed by oxidation, the engine output torque TQ is made to be increased so that all of the deposited particulate is made to be successively removed by oxidation. On the other hand, at this time, the amount of increase of the output torque TQ is consumed by the power generating action of the electric motor 37 so that the required torque is applied to the vehicle. The battery 41 is charged by the power generated at that time.

Further, in the second embodiment, after the particulate filter 24 finishes being warmed up at the time of engine startup, when the engine output torque TQ is higher than the output torque of the above limited partial operating region as shown by Y in FIG. 6 and FIG. 7, the engine output torque TQ is decreased from the required torque so that the engine output torque TQ becomes the output torque of the above limited partial operating region and the amount of decrease of the output torque TQ is compensated for by the vehicle drive power of the electric motor 37.

That is, when the engine output torque TQ is higher than an engine output torque at which deposited particulate can be continuously removed by oxidation, the engine output torque TQ is made to be decreased so that the deposited particulate is made to be successively removed by oxidation. On the other hand, at this time, the amount of decrease of the output torque TQ is compensated for by the vehicle drive power of the electric motor 37 so that the required torque is applied to the vehicle. At that time, the battery 41 is discharged.

Further, in the second embodiment as well, before the particulate filter 24 finishes being warmed up at the time of engine startup, the engine output torque TQ is made to be increased and thereby the particulate filter 24 is made to rapidly warm up.

FIG. 12 shows the processing routine for continuous oxidation for working the second embodiment.

Referring to FIG. 12, first, at step 300, it is judged if the particulate filter 24 has finished being warmed up at the time of engine startup. When the particulate filter 24 has not finished being warmed up, the routine proceeds to step 301, where control is performed for warmup of the particulate filter 24 at the time of engine startup by the warmup control routine shown in FIG. 10.

On the other hand, when it is judged that the particulate filter 24 has finished being warmed up at step 300, the routine proceeds to step 302, where it is judged if the engine output torque TQ is lower than the output torque $TQ_0$ in the continuous oxidation removal region shown in FIG. 6 and FIG. 7. When the engine output torque TQ is lower than the output torque $TQ_0$ in the continuous oxidation removal region shown in FIG. 6 and FIG. 7, the routine proceeds to step 303, where the temperature raising control shown in FIG. 11 is performed.

On the other hand, when it is judged at step 302 that the engine output torque TQ is not lower than the output torque $TQ_0$ in the continuous oxidation removal region shown in FIG. 6 and FIG. 7, the routine proceeds to step 304 where it is judged if the engine output torque TQ is higher than the output torque $TQ_0$ in the continuous oxidation removal region shown in FIG. 6 and FIG. 7. When the engine output torque TQ is higher than the output torque $TQ_0$ in the continuous oxidation removal region shown in FIG. 6 and FIG. 7, the routine proceeds to step 305, where the engine output torque TQ is made to be decreased with respect to the required torque so as to become the continuous oxidation removal region GG and I shown in FIG. 6 and FIG. 7. Next, at step 306, the motor control circuit is made to operate so that the amount of decrease of the output torque TQ becomes the vehicle drive power of the electrical motor 37. The battery 41 is discharged at this time.

Next, a third embodiment according to the present invention will be explained.

In the third embodiment, provision is made of an estimating means for estimating the amount of deposited particulate on the particulate filter 24. When it is estimated by the estimating means that the amount of deposited particulate on the particulate filter 24 exceeds a predetermined allowable amount, when the temperature TF of the particulate filter 24 is less than a temperature at which deposited particulate can be continuously removed by oxidation, that is, when the temperature TF of the particulate filter 24 is lower than a temperature of the balance point GG determined by the amount G of deposited particulate as shown by X in FIG. 6 and FIG. 7, the engine output torque TQ is increased from the required torque so that the temperature of the particulate filter 24 becomes a temperature at which the deposited particulate can be continuously removed by oxidation, that is, the engine operating state becomes the continuous oxidation removal region GG and I shown in FIG. 6 and FIG. 7, and the amount of increase of the output torque is consumed for the power generating action of the electric motor 37.

Further, in the third embodiment, when it is estimated by the above estimating means that the amount of deposited particulate on the particulate filter 24 has exceeded the predetermined allowable amount, as shown by Y in FIG. 6 and FIG. 7, when the amount of exhausted particulate is larger than an amount of exhausted particulate on the balance point GG determined from the temperature TF of the particulate filter 24, the engine output torque Q is decreased from the required torque so that the amount of exhausted particulate G becomes an amount at which deposited particulate can be continuously removed by oxidation, that is, the engine operating state becomes the continuous oxidation removal region GG and I shown in FIG. 6 and FIG. 7, and the amount of decrease of the output torque is compensated for by the vehicle drive power of the electric motor 37.

In this way, in the third embodiment, the amount of deposited particulate on the particulate filter 24 is estimated and the engine output torque TQ is increased or decreased based on the estimated amount of deposited particulate. In this case, it is also possible to provide a detecting means for detecting a pressure loss at the particulate filter 24 and estimate that the amount of deposited particulate on the particulate filter has exceeded an allowable amount when the pressure loss exceeds a set value or possible to provide a calculating means for calculating the amount of deposited particulate on the particulate filter based on the temperature of the particulate filter 24 and the amount of exhausted particulate G and estimate that amount of deposited particulate on the particulate filter has exceeded the allowable value when the amount of deposited particulate calculated by the calculating means has exceeded the allowable value.

Figure 13:
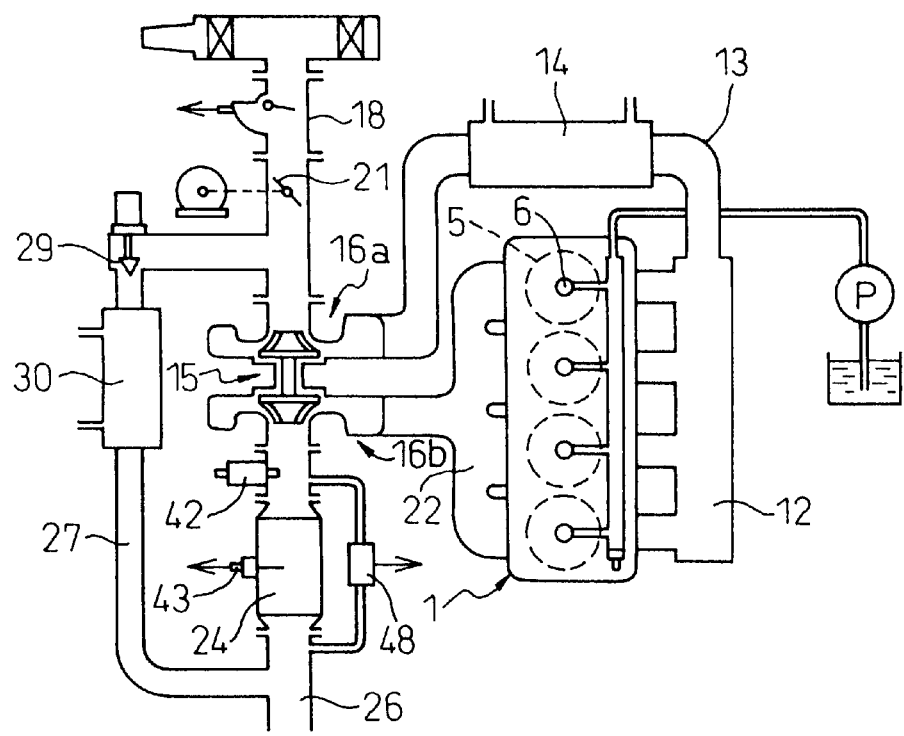
FIG. 13 is an overview of another embodiment of an internal combustion engine.

Note that as the detecting means for detecting the pressure loss at the particulate filter 24, it is possible to use a pressure sensor 48 able to detect the pressure difference between the upstream side exhaust gas pressure and the downstream side exhaust gas pressure of the particulate filter 24 shown in FIG. 13. Further, instead of detecting the pressure loss using this pressure sensor 48, it is possible to detect the pressure of only the upstream side of the particulate filter 24 and detect the pressure loss from that pressure. Further, when providing the takeout port of the EGR gas at the upstream side of the particulate filter 24, when the pressure loss increases, if the opening degree of the EGR control valve 29 is the same, the amount of EGR gas increases. At this time, if the EGR control valve 29 is controlled so that the amount of intake air does not change, the opening degree of the EGR control valve 29 is made to be decreased. Therefore, it is also possible to detect the pressure loss from the change in the amount of EGR gas or the opening degree of the EGR control valve 29. In the present invention, detecting the pressure loss includes the case of detecting the pressure loss by these various methods.

Figure 14:
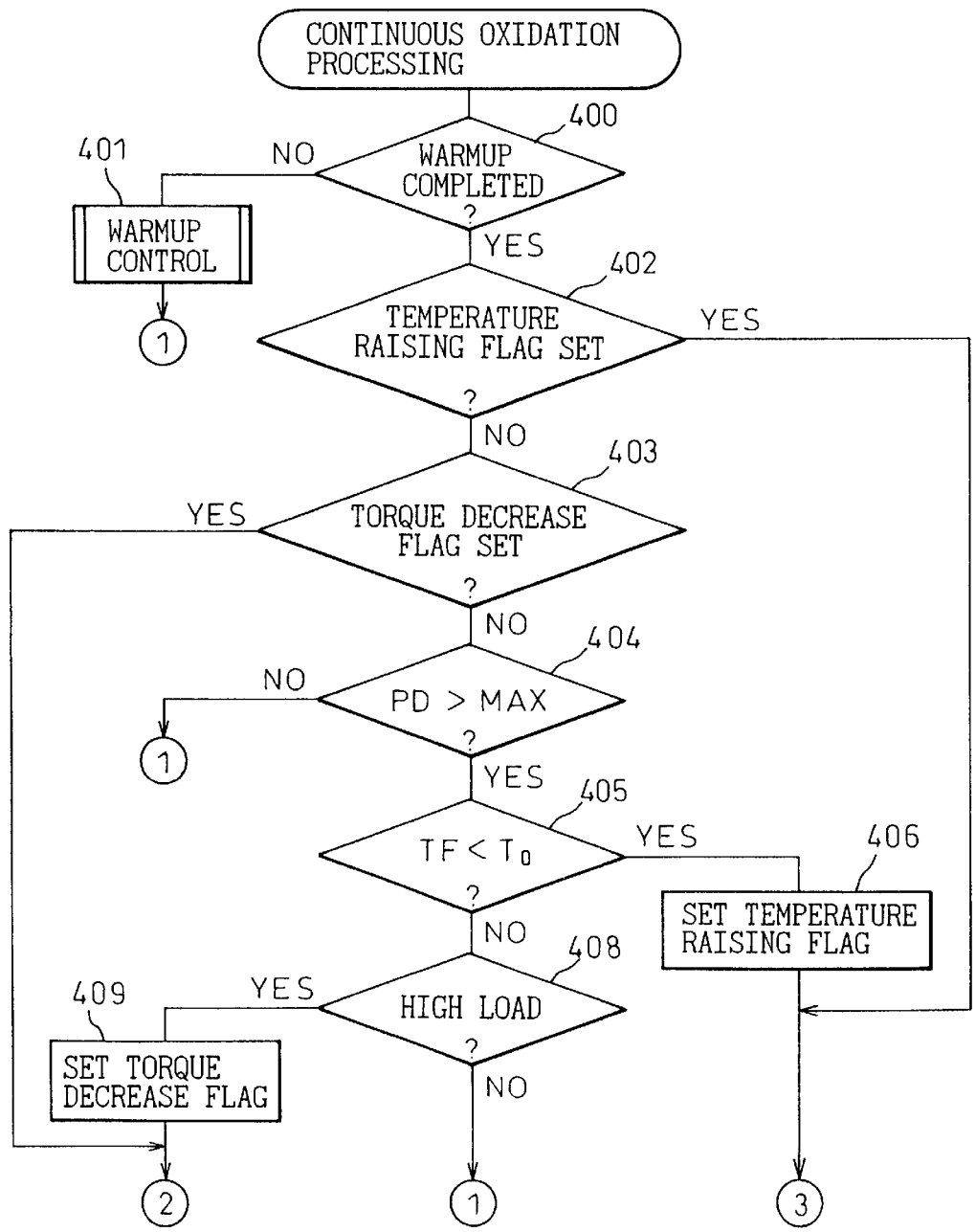
FIGS. 14 and 15 are flow charts for execution of a first example of a third embodiment of continuous oxidation processing of deposited particulate.
Figure 15:
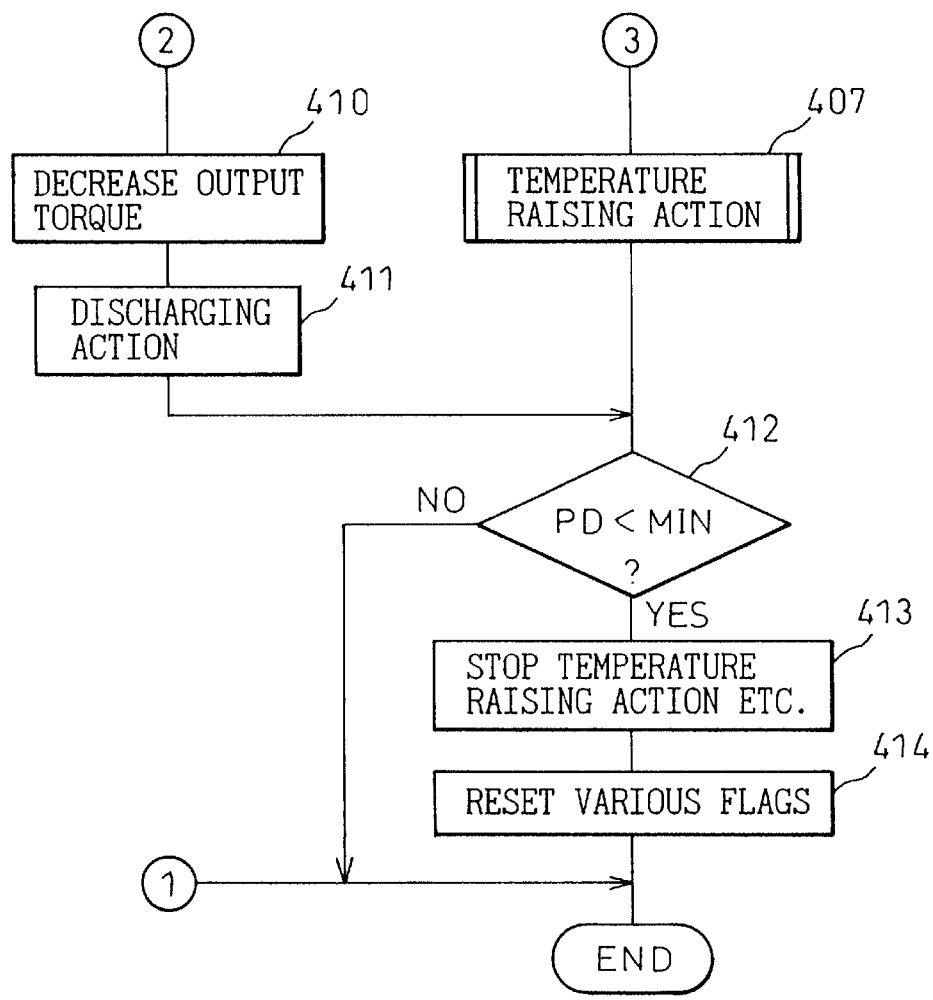

FIG. 14 and FIG. 15 show a processing routine for continuous oxidation when detecting the pressure loss of the particulate filter 24 and performing processing for continuous oxidation of deposited particulate based on the detected pressure loss.

Referring to FIG. 14 and FIG. 15, first, at step 400, it is judged if the particulate filter 24 has finished being warmed up at the time of engine startup. When the particulate filter 24 has not finished being warmed up, the routine proceeds to step 401, where control is performed for warmup of the particulate filter 24 at the time of engine startup as shown in FIG. 10.

As opposed to this, when it is judged that the particulate filter 24 has finished being warmed up at step 400, the routine proceeds to step 402, where it is judged if a temperature raising flag has been set. Normally, the temperature raising flag is reset, so the routine proceeds to step 403, where it is judged if a torque decrease flag has been set. Normally, the torque decrease flag is reset, so the routine proceeds to step 404, where it is judged if the pressure loss PD at the particulate filter 24 detected by the pressure sensor 48 has exceeded a set value MAX. When PD≦MAX, the processing cycle is ended.

On the other hand, when PD>MAX, the routine proceeds to step 405, where it is judged if the temperature TF of the particulate filter 24 detected by the temperature sensor 43 is lower than a temperature $T_0$ at which the deposited particulate can be continuously removed by oxidation. When TF<$T_0$, the routine proceeds to step 406, where the temperature raising flag is set, then the routine proceeds to step 407. When the temperature raising flag is once set, at the next processing cycle, the routine jumps from step 402 to step 407.

At step 407, the temperature raising control shown in FIG. 11 is performed. That is, the engine output torque TQ is made to be increased from the required torque so that the engine operating state becomes the continuous oxidation removal region GG and I shown in FIG. 6 and FIG. 7. Further, at this time, the motor control circuit 40 is made to be operated so that the amount of increase of the output torque is consumed by the power generating action of the electric motor 37. The battery 41 is charged by the power generated at this time. Next, the routine proceeds to step 412.

On the other hand, when it is judged at step 405 that TF≧$T_0$, the routine proceeds to step 408, where it is judged if the engine is operating at a high load. When operating at a high load, the routine proceeds to step 409, where the torque decrease flag is set, then the routine proceeds to step 410. When the torque decrease flag is once been set, at the next processing cycle, the routine jumps from step 403 to step 410.

At step 410, the engine output torque TQ is made to be decreased with respect to the required torque so as to become the continuous oxidation removal region GG and I shown in FIG. 6 and FIG. 7. Next, at step 411, the motor control circuit 40 is made to operate so that the amount of decrease of the output torque TQ becomes the vehicle drive power of the electric motor 37. At this time, the battery 41 is discharged. Next, the routine proceeds to step 412.

At step 412, it is judged if the pressure loss PD has become lower than a lower limit MIN. If PD<MIN, the routine proceeds to step 413, where the temperature raising action, the decrease of the output torque, and the discharging action are stopped, then at step 414 the temperature raising flag and torque decrease flag are reset.

Figure 16:
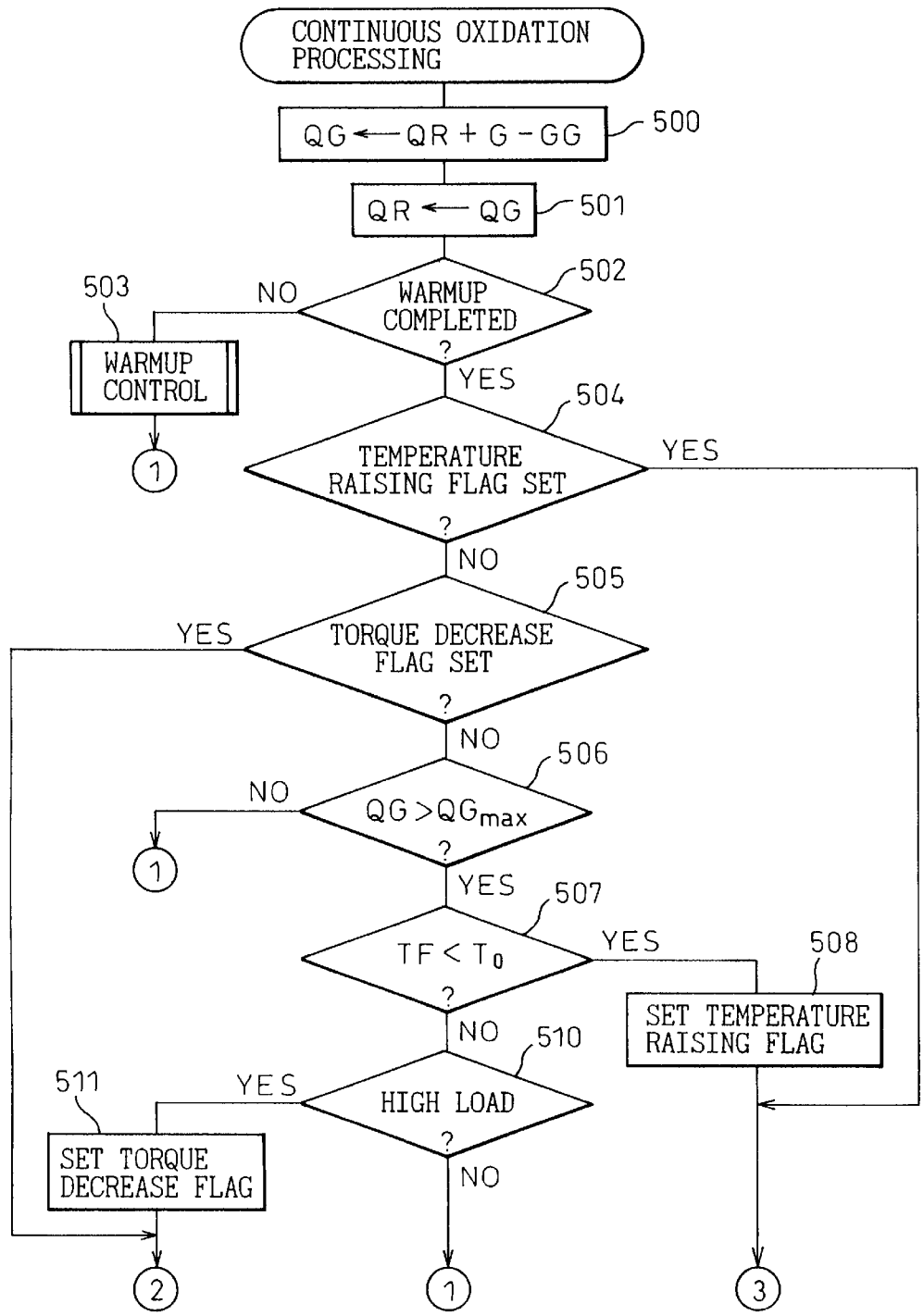
FIGS. 16 and 17 are flow charts for execution of a second example of a third embodiment of continuous oxidation processing of deposited particulate.
Figure 17:
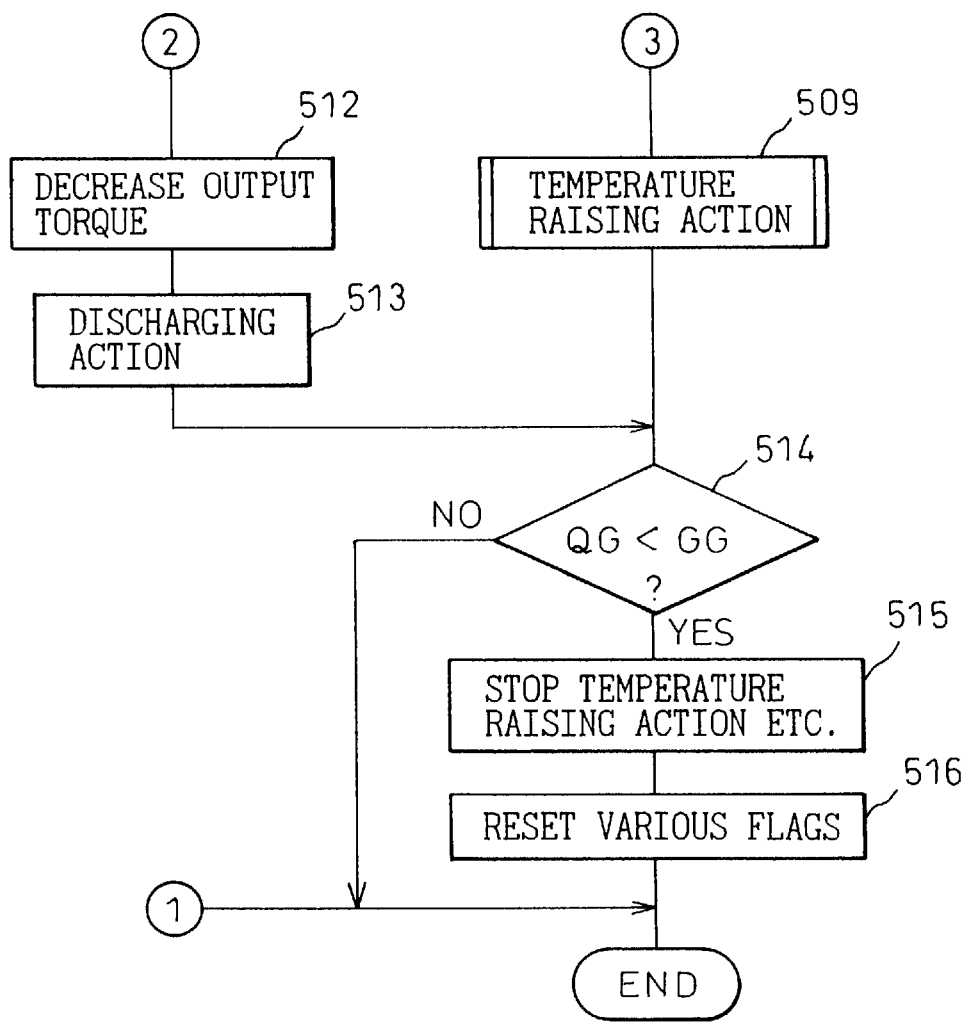

FIGS. 16 and 17 show a processing routine for continuous oxidation in the case of calculating the amount of deposited particulate on the particulate filter 24 and performing processing for continuous oxidation of deposited particulate based on the calculated amount of deposited particulate.

Referring to FIG. 16 and FIG. 17, first, at step 500, the amount Q of deposited particulate is calculated based on the following expression.

$$QG \leftarrow QR+G \leftarrow GG$$

Here, QR indicates the deposited particulate calculated at the previous processing cycle, that is, the amount of residual deposited particulate, G shows the amount of exhausted particulate, and GG shows the amount of particulate removable by oxidation. In this case, the amount G of exhausted particulate is stored in advance as a function of the engine operating state, while the amount GG of particulate removable by oxidation becomes a function of the temperature TF of the particulate filter 24 as shown by the solid line GG in FIG. 5. The amount of particulate deposited is expressed as the sum of the residual amount QR of the deposited particulate and the amount G of deposited particulate. On the other hand, the amount of particulate removed by oxidation is expressed by GG, so the amount QG of deposited particulate is expressed as in the above expression.

When the amount QC of deposited particulate is calculated, the routine proceeds to step 501, where QG is made QR, then the routine proceeds to step 502. At step 502, it is judged if the particulate filter 24 has finished being warmed up at the time of engine startup. When the particulate filter 24 has not finished being warmed up, the routine proceeds to step 503, where control for warmup of the particulate filter 24 at the time of engine startup shown in FIG. 10 is performed.

As opposed to this, when it is judged at step 502 that the particulate filter 24 has finished being warmed up, the routine proceeds to step 504, where it is judged if the temperature raising flag has been set. Normally, the temperature raising flag is reset, so the routine proceeds to step 505, where it is judged if the torque decrease flag has been set. Normally, the torque decrease flag is reset, so the routine proceeds to step 506, where it is judged if the amount QG of the deposited particulate has exceeded an allowable amount $QG_{max}$. When QG≦$QG_{max}$, the processing cycle ends.

As opposed to this, when QG>$QG_{max}$, the routine proceeds to step 507, where it is judged if the temperature TF of the particulate filter 24 detected by the temperature sensor 43 is lower than a temperature $T_0$ at which the deposited particulate can be continuously removed by oxidation. When TF<$T_0$, the routine proceeds to step 508, where the temperature raising flag is set, then the routine proceeds to step 509. When the temperature raising flag is once set, at the next processing cycle, the routine jumps from step 504 to step 509.

At step 509, the temperature raising control shown in FIG. 11 is performed. That is, the engine output torque TQ is made to be increased from the required torque so that the engine operating state becomes the continuous oxidation removal region GG and I shown in FIG. 6 and FIG. 7. Further, at this time, the motor control circuit 40 is made to operate so that the amount of increase of the output torque TQ is consumed by the power generating action of the electric motor 37. The battery 41 is charged by the electric power generated at this time. Next, the routine proceeds to step 514.

On the other hand, when it is judged at step 507 that TF≧$T_0$, the routine proceeds to step 510, where it is judged if the engine is operating at a high load. When operating at a high load, the routine proceeds to step 511, where the torque decrease flag is set, then the routine proceeds to step 512. Once the torque decrease flag has been set, at the next processing cycle, the routine jumps from step 505 to step 512.

At step 512, the engine output torque TQ is made to be decreased from the required load so that the operating state becomes the continuous oxidation removal region GG and I shown in FIG. 6 and FIG. 7. Next, at step 513, the motor control circuit 40 is made to operate so that the amount of decrease of the output torque TQ becomes the vehicle drive power of the electric motor 37. At this time, the battery 41 is discharged. Next, the routine proceeds to step 514.

At step 514, it is judged if the amount QG of the deposited particulate has become smaller than the amount GG of particulate removable by oxidation. When QG<GG, the routine proceeds to step 515, where the temperature raising action, decrease of output torque, and discharging action are stopped, then at step 516, the temperature raising flag and torque decrease flag are reset.

Next, a fourth embodiment of the present invention will be explained. In the fourth embodiment, a low temperature combustion method particularly suitable for continuously removing deposited particulate by oxidation is used. Therefore, first, this low temperature combustion method will be explained.

Figure 18:
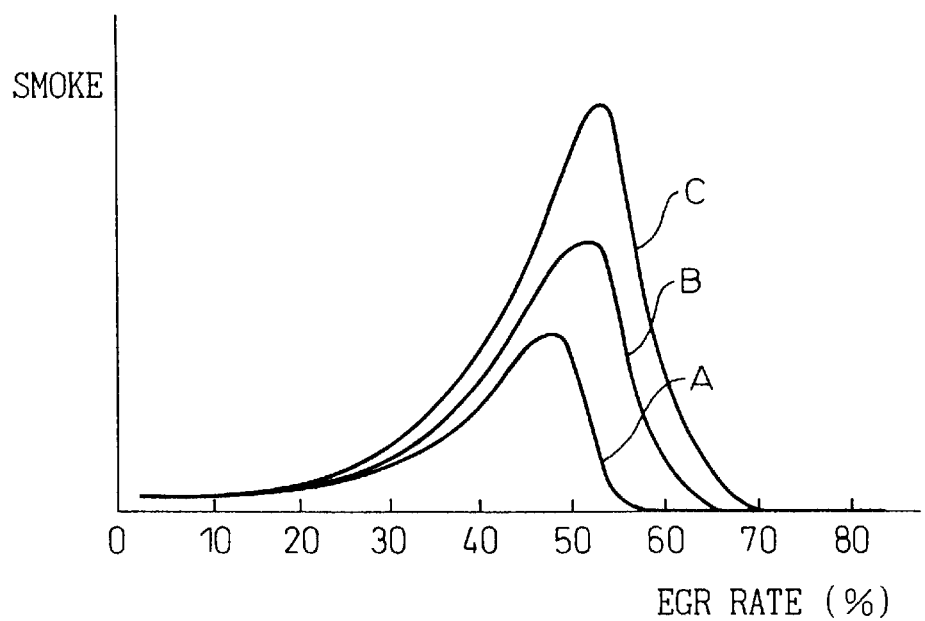
FIG. 18 is a view of the amount of production of smoke.

In the internal combustion engine shown in FIG. 1, if the EGR rate (amount of EGR gas/(amount of EGR gas+amount of intake air)) is increased, the amount of smoke produced gradually increases and then reaches a peak. If the EGR rate is then further raised, the amount of smoke produced then sharply falls. This will be explained while referring to FIG. 18 showing the relationship between the EGR rate and smoke when changing the degree of cooling of the EGR gas. Note that in FIG. 18, curve A shows the case of force-cooling the EGR gas to maintain the EGR gas temperature at substantially 90° C., curve B shows the case of cooling the EGR gas by a small-sized cooling device, and curve C shows the case of not force-cooling the EGR gas.

As shown by the curve A of FIG. 18, when force-cooling the EGR gas, the amount of smoke produced peaks when the EGR rate is slightly lower than 50 percent. In this case, if the EGR rate is made more than about 55 percent, almost no smoke is produced any longer. On the other hand, as shown by the curve B of FIG. 18, when slightly cooling the EGR gas, the amount of smoke produced peaks when the EGR rate is slightly higher than 50 percent. In this case, if the EGR rate is made more than about 65 percent, almost no smoke is produced any longer. Further, as shown by the curve C of FIG. 18, when not force-cooling the EGR gas, the amount of smoke produced peaks when the EGR rate is near 55 percent. In this case, if the EGR rate is made more than about 70 percent, almost no smoke is produced any longer.

The reason why smoke is no longer produced if the EGR gas rate is made more than 55 percent in this way is that the temperature of the fuel and surrounding gas at the time of combustion does not become that high due to the heat absorbing action of the EGR gas, that is, low temperature combustion is performed and as a result the hydrocarbons do not grow into soot.

This low temperature combustion has the feature of enabling a decrease of the amount of generation of $NO_x$ while suppressing the production of smoke, that is, the exhaust of particulate, regardless of the air-fuel ratio. That is, if the air-fuel ratio is made rich, the fuel becomes in excess, but the combustion temperature is suppressed to a low temperature, so the excess fuel does not grow into soot and accordingly almost no smoke is produced. Further, at this time, only an extremely small amount of $NO_x$ is produced. On the other hand, even when the average air-fuel ratio is lean or when the air-fuel ratio is the stoichiometric air-fuel ratio, if the combustion temperature becomes high, a small amount of soot is produced, but under low temperature combustion, the combustion temperature is suppressed to a low temperature, so almost no smoke is produced and only an extremely small amount of $NO_x$ is produced.

On the other hand, if performing low temperature combustion, the temperature of the surrounding gas becomes low, but the temperature of the exhaust gas rises. This will be explained with reference to FIGS. 19A and 19B.

Figure 19A:
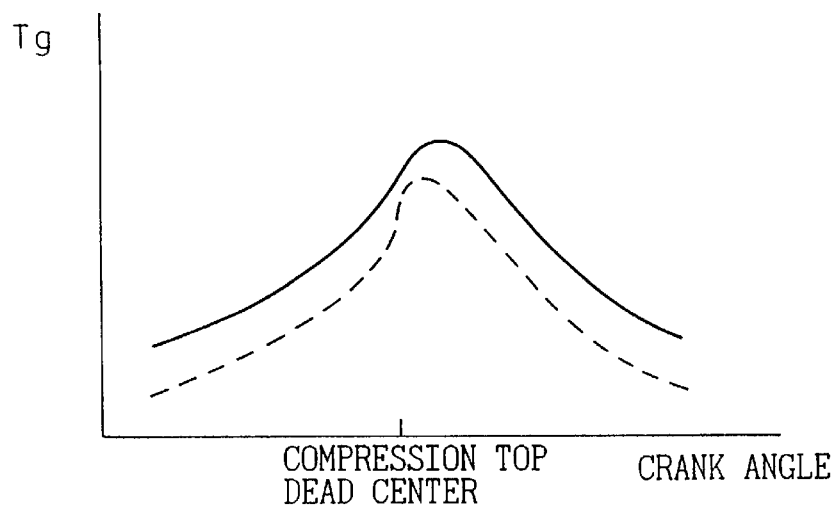
FIGS. 19A and 19B are views of gas temperature etc. in a combustion chamber.

The solid line in FIG. 19A shows the relationship between the average gas temperature Tg in the combustion chamber 5 and the crank angle at the time of low temperature combustion, while the broken line in FIG. 19A shows the relationship between the average gas temperature Tg in the combustion chamber 5 and the crank angle at the time of ordinary combustion. The solid line in FIG. 19B shows the relationship between the temperature Tf of the fuel and its surrounding gas and the crank angle at the time of low temperature combustion, while the broken line in FIG. 19B shows the relationship between the temperature Tf of the fuel and its surrounding gas and the crank angle at the time of ordinary temperature.

When low temperature combustion is performed, the amount of EGR gas is greater than at the time of ordinary combustion. Therefore, as shown in FIG. 19A, before top dead center of the compression stroke, that is, during the compression stroke, the average gas temperature Tg at the time of low temperature combustion shown by the solid line becomes higher than the average gas temperature Tg at the time of ordinary combustion shown by the broken line. Note that at this time, as shown in FIG. 19B, the temperature Tf of the fuel and its surrounding gas becomes about the same temperature as the average gas temperature Tg.

Figure 19B:
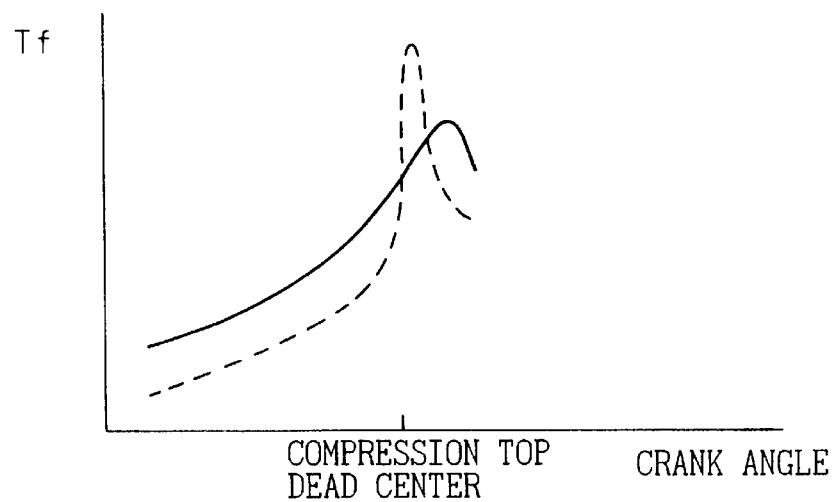

Next, combustion is started near top dead center of the compression stroke, but in this case, when low temperature combustion is performed, as shown by the solid line in FIG. 19B, the temperature Tf of the fuel and its surrounding gas does not become that high due to the endothermic action of the EGR gas. As opposed to this, when ordinary combustion is performed, there is a large amount of oxygen present around the fuel, so, as shown by the broken line of FIG. 19B, the temperature Tf of the fuel and its surrounding gas becomes extremely high. In this way, at the time of ordinary combustion, the temperature Tf of the fuel and its surrounding gas becomes considerably higher than the case of low temperature combustion, but the temperature of the other gas, which constitutes the majority, becomes lower at the time of ordinary combustion than the case of low temperature combustion. Therefore, as shown in FIG. 19A, the average gas temperature Tg in the combustion chamber 5 near top dead center of the compression stroke becomes higher than the case of ordinary combustion. As a result, as shown in FIG. 19A, the temperature of the burnt gas in the combustion chamber 5 after the combustion is finished becomes higher in the case of low temperature combustion than in the case of ordinary combustion and therefore the temperature of the exhaust gas becomes higher if low temperature combustion is performed.

Figure 20:
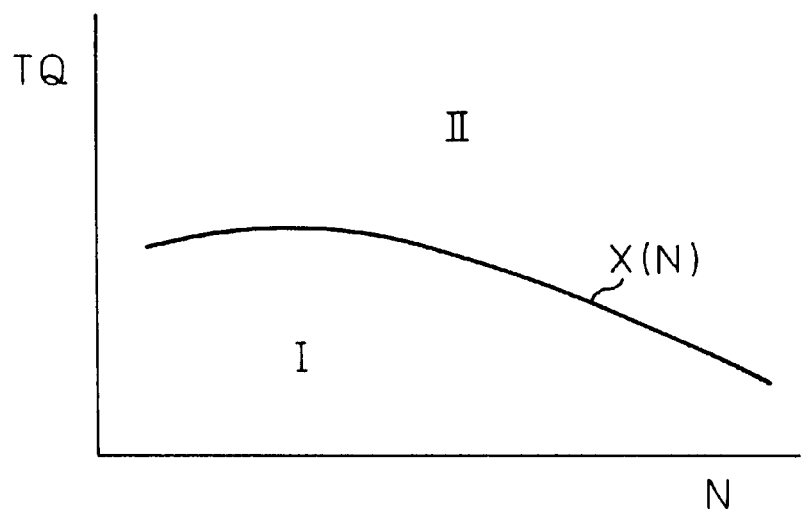
FIG. 20 is a view of operating regions I and II.

However, if the required torque TQ of the engine becomes higher, that is, if the amount of fuel injection becomes greater, the temperature of the fuel and surrounding gas at the time of combustion becomes higher, so low temperature combustion becomes difficult. That is, low temperature is performed only at the time of engine medium- and low-load operation where the amount of heat generated by the combustion is relatively small. In FIG. 20, region I shows the operating region where a first combustion where the amount of inert gas in the combustion chamber 5 is larger than the amount of inert gas where the amount of production of soot peaks, that is, low temperature combustion, is possible, while region II shows the operating region where second combustion where the amount of inert gas in the combustion chamber 5 is smaller than the amount of inert gas where the amount of production of soot peaks, that is, ordinary combustion, is possible.

Figure 21:
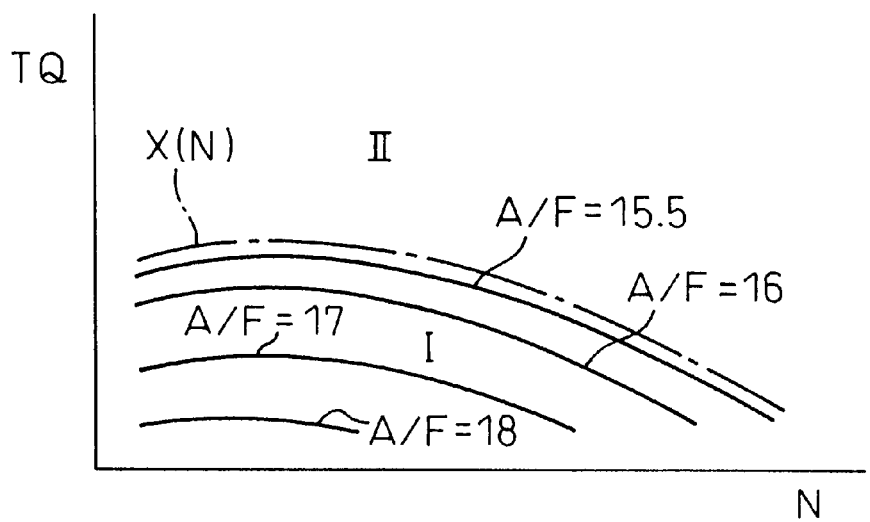
FIG. 21 is a view of an air-fuel ratio A/F.
Figure 22:
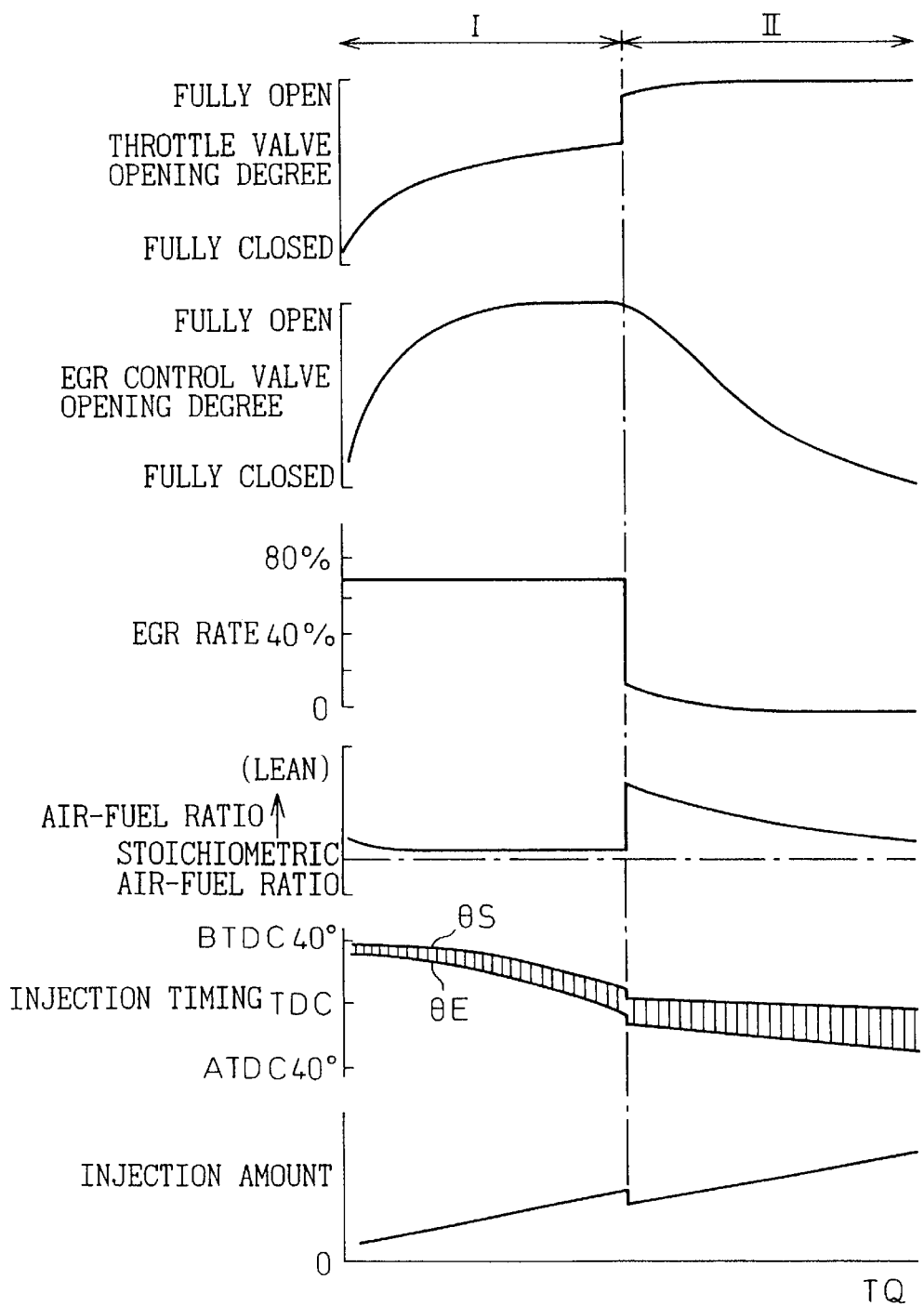
FIG. 22 is a view of changes in a throttle valve opening degree etc.

FIG. 21 shows the target air-fuel ratio A/F in the case of low temperature combustion in the operating region I. FIG. 22 shows the opening degree of the throttle valve 21, the opening degree of the EGR control valve, the EGR rate, the air-fuel ratio, the injection start timing θS, the injection end timing θE, and the amount of injection in accordance with the required torque TQ in the case of low temperature combustion in the operating region I. Note that FIG. 22 shows together the opening degree of the throttle valve 21 etc. at the time of ordinary combustion performed in the operating region II. From FIG. 21 and FIG. 22, it is learned that when low temperature combustion is performed in the operating region I, the EGR rate is made at least 55 percent and the air-fuel ratio is made a lean air-fuel ratio of 15.5 to 18 or so.

The ability of the particulate filter 24 to remove particulate by oxidation falls at the time of engine low load operation when the temperature of the exhaust gas falls. At the time of engine low load operation, however, if low temperature combustion is performed, as explained above, the temperature of the exhaust gas rises. Further, the amount of exhaust of unburnt HC and CO increases, so the temperature of the particulate filter 24 is made to rise by the heat of oxidation reaction of the unburnt HC and CO. Further, at this time, the amount of production of smoke, that is, the amount of exhausted particulate, becomes extremely small and therefore even at the time of engine low-load operation, it becomes possible to continuously remove all deposited particulate of the particulate filter 24 by oxidation. This is the reason why low temperature combustion is suited for continuous removal of deposited particulate by oxidation.

In the fourth embodiment, this low temperature combustion is used for continuous oxidation processing of the deposited particulate. That is, in the fourth embodiment, provision is made of a switching means for switching between a first combustion where the amount of inert gas in the combustion chamber 5 is larger than the amount of inert gas where the amount of production of soot peaks and a second combustion where the amount of inert gas in the combustion chamber 5 is smaller than the amount of inert gas where the amount of production of soot peaks. The second combustion is switched to the first combustion, that is, low temperature combustion, after the particulate filter 24 finishes being warmed up and the amount of deposited particulate of the particulate filter 24 is estimated to exceed a predetermined allowable amount. Further, the torque difference between the output torque of the engine and the required torque is adjusted by the electric motor 37 so that the required torque is given to the vehicle.

When the second combustion is switched to the low temperature combustion in this way, the temperature of the exhaust gas rises and the amount of exhausted particulate is decreased, so it becomes possible to successively remove by oxidation all of the deposited particulate. Further, as explained above, since low temperature combustion is possible only during medium and low-load operation, when switching to low temperature combustion at the time of high-load operation where the second combustion is performed, the output torque TQ of the engine is decreased from the required torque and the amount of decrease of the output torque is compensated for by the vehicle drive power of the electric motor 37. On the other hand, when switching to low temperature combustion at the time of medium- or low-load operation where second combustion is being performed, the engine output torque TQ is sometimes decreased and sometimes increased to give the required torque to the vehicle. In this case, when decreasing the engine output torque TQ from the required torque, the amount of decrease of the output torque TQ is compensated for by the vehicle drive power of the electric motor 37, while when increasing the engine output torque TQ from the required torque, the amount of increase of the output torque TQ is consumed by the power generating action of the electric motor 37. That is, the torque difference between the engine output torque TQ and the required torque is adjusted by the electric motor 37.

Further, in the fourth embodiment, before the particulate filter 24 finishes being warmed up at the time of engine startup, low temperature combustion is performed. At this time, the torque difference between the output torque TQ of the engine and the required torque is adjusted so that the required torque is given to the vehicle.

Figure 23:
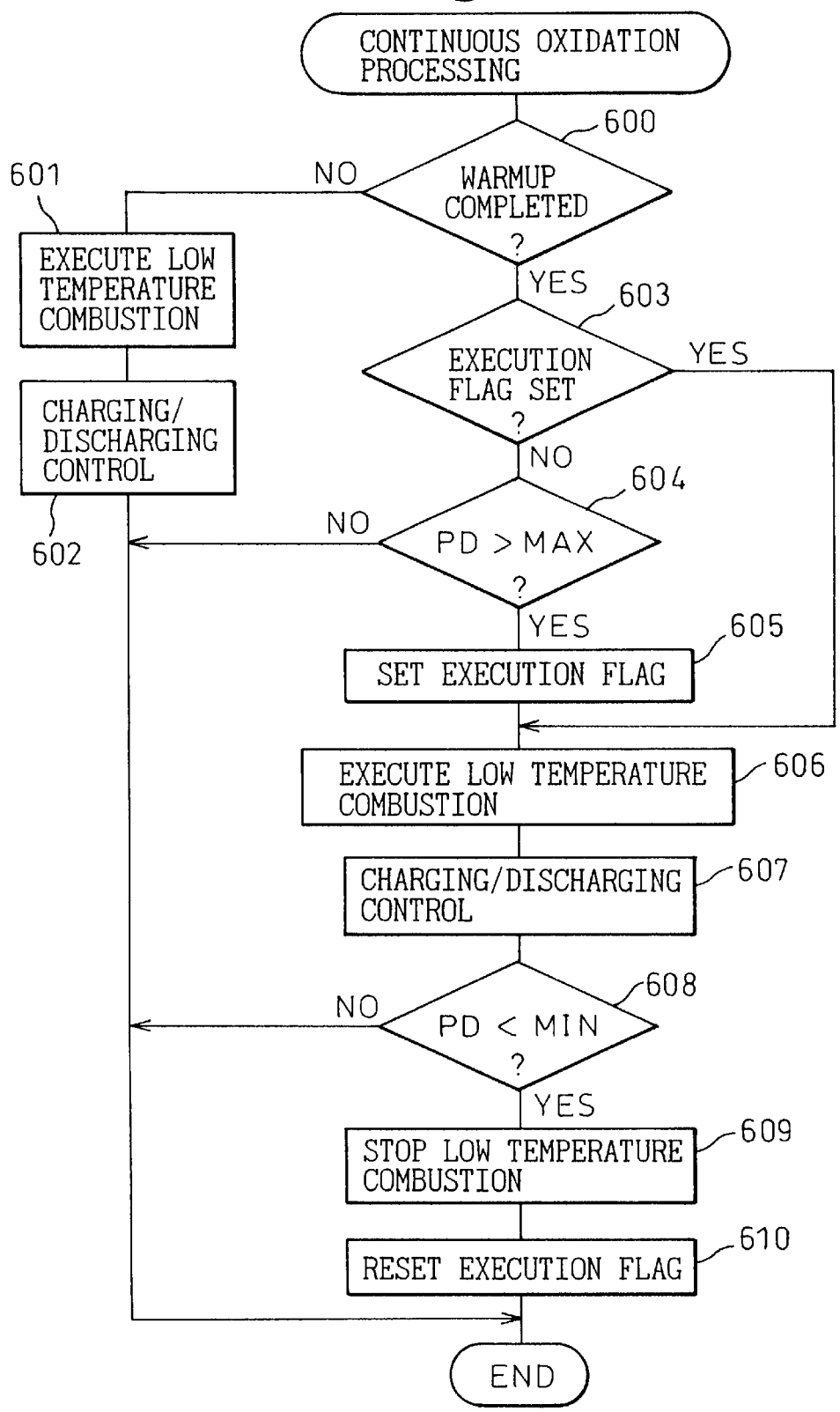
FIG. 23 is a flow chart for execution of a fourth embodiment of continuous oxidation processing of deposited particulate.

FIG. 23 shows a processing routine for continuous oxidation for working the fourth embodiment.

Referring to FIG. 23, first, at step 600, it is judged if the particulate filter 24 has finished being warmed up at the time of engine startup. When the particulate filter 24 has not finished being warmed up, the routine proceeds to step 601, where low temperature combustion is performed, then at step 602 the charging and discharging action of the battery 41 is controlled and the torque difference between the engine output torque TQ and the required torque is adjusted by the electric motor 37.

As opposed to this, when it is judged at step 600 that the particulate filter 24 has finished being warmed up, the routine proceeds to step 603, where it is judged if an execution flag has been set. Normally, the execution flag is reset, so the routine proceeds to step 604, where it is judged if a pressure loss PD at the particulate filter 24 detected by the pressure sensor 48 has exceeded the set value MAX. When PD≦MAX, the processing cycle ends.

As opposed to this, when PD>MAX, the routine proceeds to step 605, where the execution flag is set, then the routine proceeds to step 606. Once the execution flag is set, at the next processing cycle, the routine jumps from step 603 to step 606. At step 606, low temperature combustion is executed, then at step 607, the charging and discharging action of the battery 41 is controlled and the torque difference between the engine output torque TQ and the required torque is adjusted by the electric motor 37.

Next, at step 608, it is judged if the pressure loss PD has become lower than the lower limit MIN. When PD<MIN, the routine proceeds to step 609, where the low temperature combustion is switched to the second combustion, then at step 610, the execution flag is reset.

Next, a fifth embodiment according to the present invention will be explained.

When the temperature TF of the particulate filter 24 is lower than a temperature at which the deposited particulate can be continuously removed by oxidation, the engine output torque TQ is increased from the required torque, whereby all of the deposited particulate can be successively removed by oxidation. At this time, the battery 41 is charged. On the other hand, even if performing low temperature combustion at this time, all of the deposited particulate can be successively removed by oxidation. At this time, normally it is necessary to supplement the vehicle drive power by the electric motor 37. Therefore, at this time, the battery 41 is discharged. Therefore, by alternately repeating an increase of the engine output torque TQ and the low temperature combustion, the power charged in the battery 41 at the time of increase of the engine output torque TQ can be used for driving the electric motor 37 at the time of low temperature combustion and therefore it is possible to perform a temperature raising action of the particulate filter 24 over a long time while maintaining the representative value of charging of the battery 41 within an allowable range.

Therefore, in the fifth embodiment, when the temperature of the particulate filter 24 is lower than a temperature at which the deposited particulate can be continuously removed by oxidation, when the representative value of charging of the battery 41 is lower than a set representative value, the engine output torque TQ is increased from the required torque under the second combustion and the amount of increase of the output torque TQ is consumed for the power generating action of the electric motor 37, while when the representative value of charging of the battery 41 exceeds the set representative value, the second combustion is switched to the first combustion and the amount of decrease of the output torque TQ is compensated for by the vehicle drive power of the electric motor 37.

Further, when the amount G of exhausted particulate is larger than an amount at which the deposited particulate can be continuously removed by oxidation, the engine output torque TQ is decreased from the required torque, whereby it is possible to successively remove all the deposited particulate by oxidation. During this time, however, if the temperature TF of the particulate filter 24 is too low, all the deposited particulate can no longer be successively removed by oxidation. Therefore, in the second embodiment, when the temperature TF of the particulate filter 24 falls too much, low temperature combustion is performed and the temperature TF of the particulate filter 24 is raised. When all of the deposited particulate can be successively removed by oxidation, the second combustion is again switched to and the engine output torque TQ is decreased from the required torque under the second combustion.

That is, in the fifth embodiment, when the amount of exhausted particulate G is larger than an amount at which the deposited particulate can be continuously removed by oxidation, the engine output torque TQ is decreased from the required torque under the second combustion and the amount of decrease of the output torque TQ is compensated for by the vehicle drive power of the electric motor 37, while when the temperature of the particulate filter 24 falls below a temperature at which the deposited particulate can be continuously removed by oxidation, the second combustion is switched to the low temperature combustion and the torque difference between the engine output torque TQ and the required torque is adjusted by the electric motor 37 so that the required torque is given to the vehicle.

Figure 24:
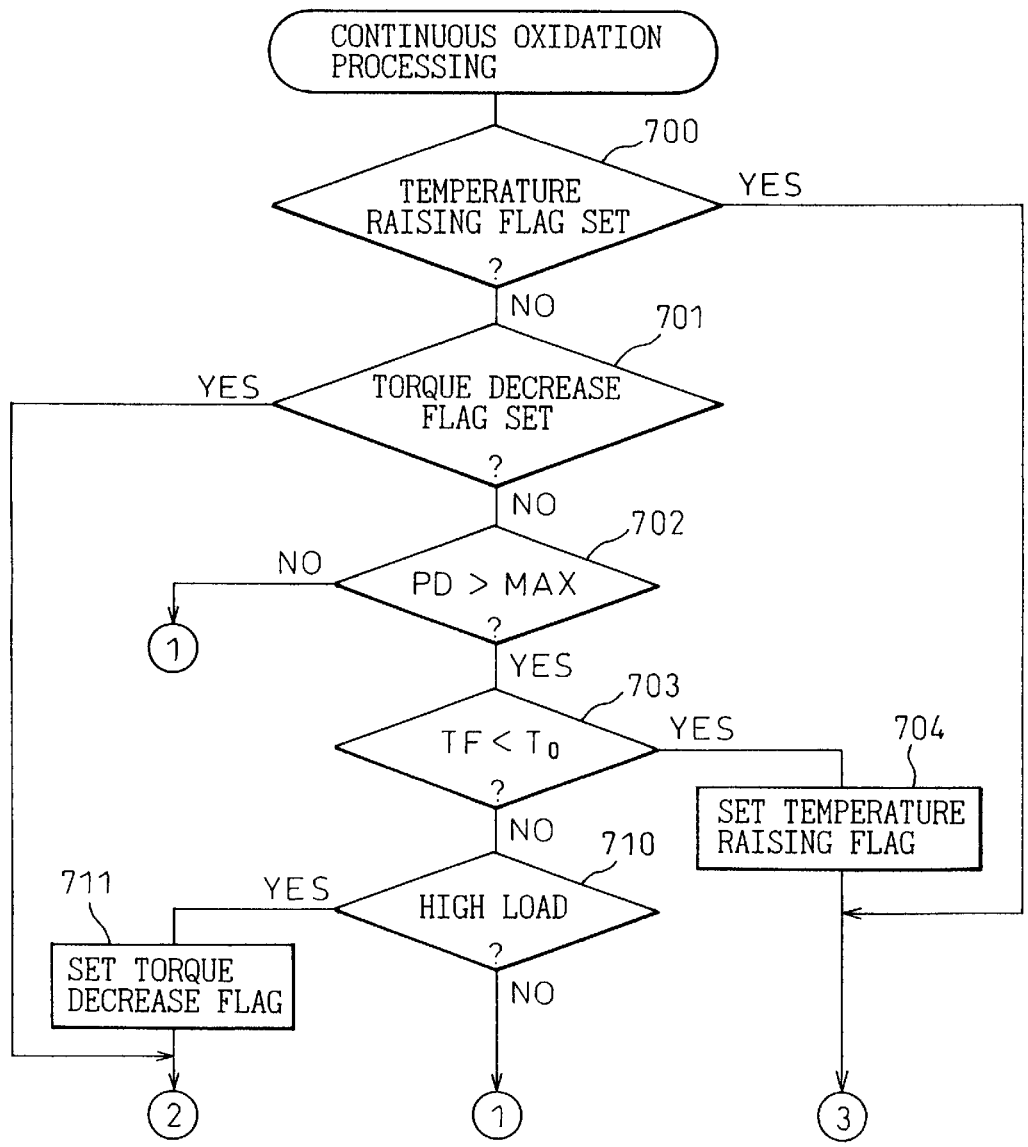
FIGS. 24 and 25 are flow charts for execution of a fifth embodiment of continuous oxidation processing of deposited particulate.
Figure 25:
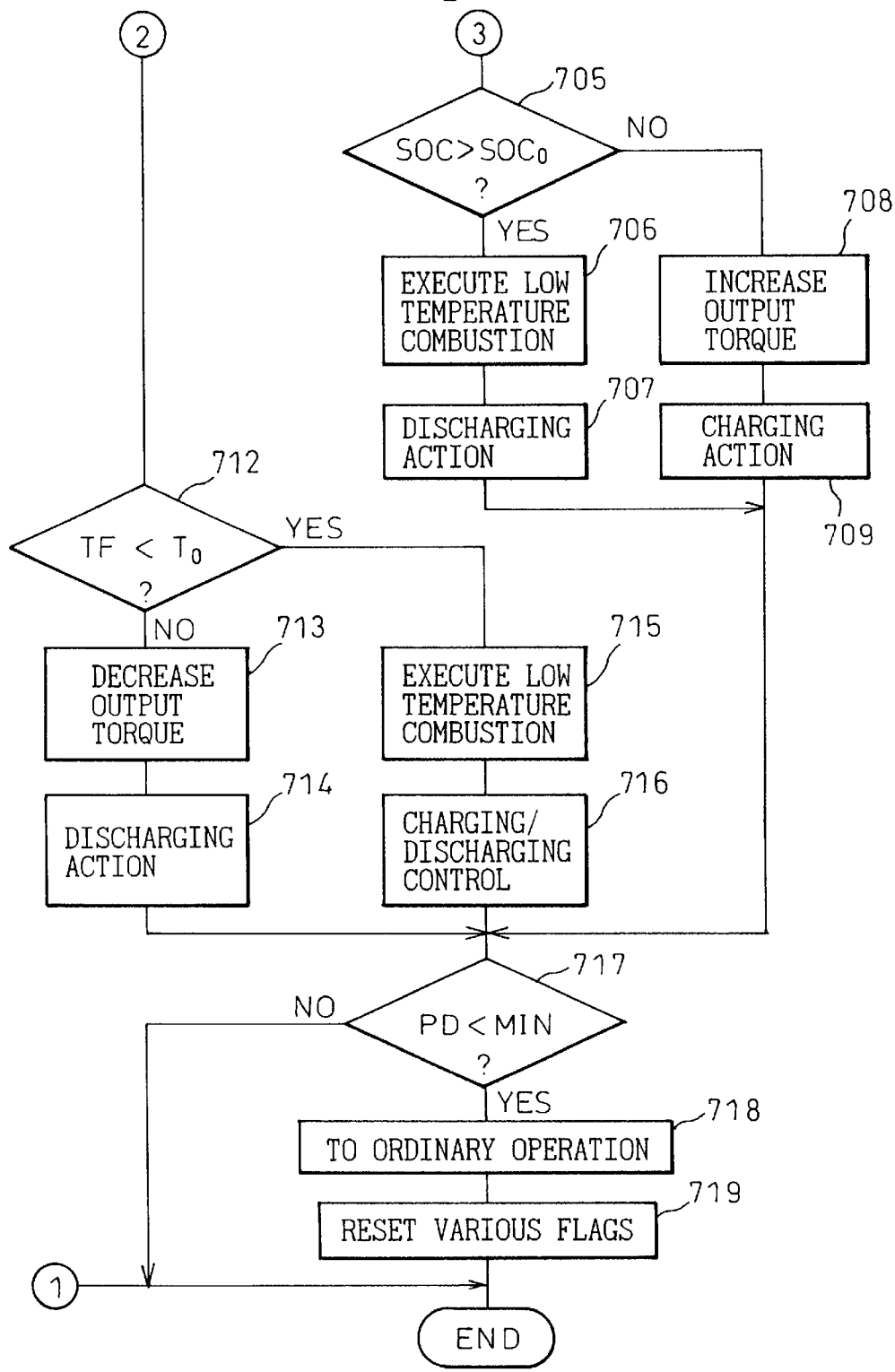

FIG. 24 and FIG. 25 show a processing routine for continuous oxidation of deposited particulate for executing the fifth embodiment.

Referring to FIG. 24 and FIG. 25, first, at step 700, it is judged if the temperature raising flag has been set. Normally, the temperature raising flag is reset, so the routine proceeds to step 701, where it is judged if a torque decrease flag has been set. Normally, the torque decrease flag has been reset, so the routine proceeds to step 702, where it is judged if the pressure loss PD at the particulate filter 24 detected by the pressure sensor 48 has exceeded the set value MAX. When PD≦MAX, the processing cycle ends.

As opposed to this, when PD>MAX, the routine proceeds to step 703, where it is judged if the temperature TF of the particulate filter 24 detected by the temperature sensor 43 is lower than a temperature $T_0$ at which the deposited particulate can be continuously removed by oxidation. When TF<$T_0$, the routine proceeds to step 704, where the temperature raising flag is set, then the routine proceeds to step 705. When the temperature raising flag is once set, at the next processing cycle, the routine jumps from step 700 to step 705.

At step 705, it is judge if the representative value of charging SOC of the battery 41 is greater than a set representative value $SOC_0$. When SOC>$SOC_0$, the routine proceeds to step 706, where low temperature combustion is performed, then at step 707, the motor control circuit 40 is made to operate so that the amount of decrease of the output torque TQ becomes the vehicle drive power of the electric motor 37. At this time, the battery 41 is discharged. Next, the routine proceeds to step 717. As opposed to this, when it is judged at step 705 that SOC≦$SOC_0$, the routine proceeds to step 708, where the engine output torque TQ is made to be increased from the required torque so that the engine operating state becomes the continuous oxidation removal region GG and I shown in FIG. 6 and FIG. 7. Next, at step 709, the motor control circuit 40 is made to operate so that the amount of increase of the output torque TQ is consumed by the power generating action of the electric motor 37. The battery 41 is charged by the power generated at this time. Next, the routine proceeds to step 717.

On the other hand, when it is judged at step 703 that TF≧$T_0$, the routine proceeds to step 710, where it is judged if the engine is operating under a high load. When the engine is operating under a high load, the routine proceeds to step 711, where the torque decrease flag is set, then the routine proceeds to step 712. Once the torque decrease flag is set, at the next processing cycle, the routine jumps from step 701 to step 712.

At step 712, it is judged if the temperature TF of the particulate filter 24 detected by the temperature sensor 43 has become lower than a temperature $T_0$ at which the deposited particulate can be continuously removed by oxidation. When TF≧$T_0$, the routine proceeds to step 713, where the engine output torque TQ is made to be decreased from the required torque so that the operating state becomes the continuous oxidation removal region GG and I shown in FIG. 6 and FIG. 7. Next, at step 714, the motor control circuit 50 is made to operate so that the amount of decrease of the output torque TQ becomes the vehicle drive power of the electric motor 37. At this time, the battery 41 is discharged. Next, the routine proceeds to step 717.

As opposed to this, when it is judged at step 712 that TF<$T_0$, the routine proceeds to step 715, where low temperature combustion is performed, then at step 716, the charging and discharging action of the battery 41 is controlled and the torque difference between the engine output torque TQ and the required torque is adjusted. Next, the routine proceeds to step 717.

At step 717, it is judged if the pressure loss PD has become lower than the lower limit MIN. When PD<MIN, the routine proceeds to step 718, where ordinary operation under the second combustion is returned to, then at step 719, the temperature raising flag and torque decrease flag are reset.

Next, another embodiment of the electric power device will be explained with reference to FIG. 26.

Figure 26:
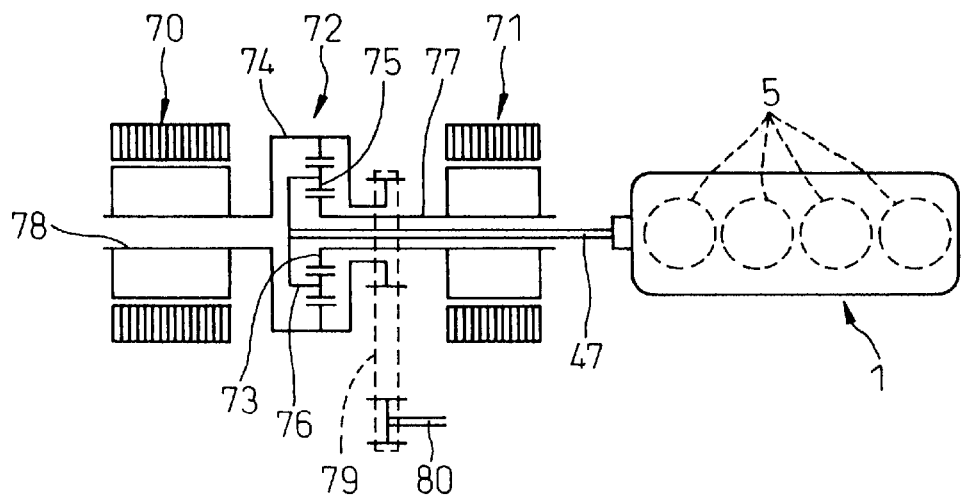
FIG. 26 is a view of another embodiment of an electric power device.

Referring to FIG. 26, in this embodiment, the electric power device is comprised of a pair of motor/generators 70 and 71 operating as electric motors and power generators and a planetary gear mechanism 72. The planetary gear mechanism 72 is provided with a sun gear 73, a ring gear 74, a planetary gear 75 arranged between the sun gear 73 and ring gear 74, and a planetary gear 76 carrying the planetary gear 75. The sun gear 73 is connected to a rotary shaft 77 of the motor/generator 71, while the planetary gear 76 is connected to an output shaft 47 of the internal combustion engine 1. Further, the ring gear 74 is on the one hand connected to a rotary shaft 78 of the motor/generator 70, while on the other hand is connected to an output shaft 80 connected to the drive wheels through a belt 79. Therefore, it is learned that when the ring gear 74 rotates, the output shaft 80 is made to rotate along with that.

While a detailed explanation of the operation of the electric power device will be omitted, explaining it in short, the motor/generator 70 mainly operates as an electric motor, while the motor/generator 71 mainly operates as a power generator. It is possible to stop the operation of the internal combustion engine 1 and drive the vehicle by the motor/generator 70.

Figure 27:
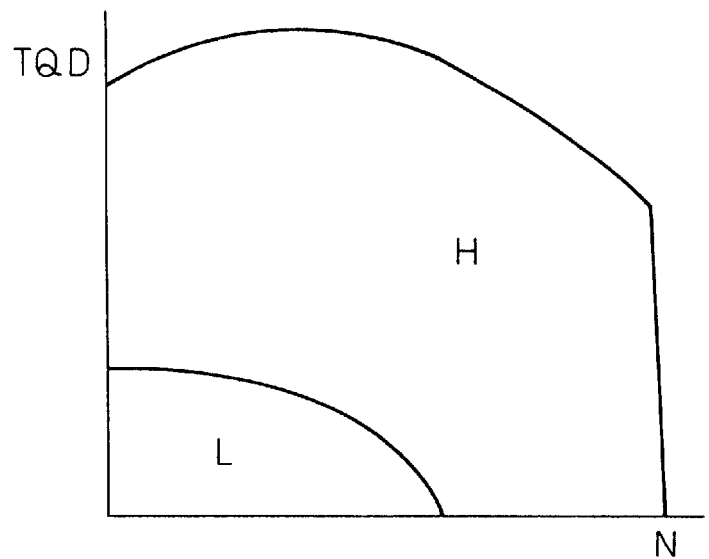
FIG. 27 is a view of operating regions L and H.

FIG. 27 shows the operational control after warmup is completed. In the low-speed low-load operating region L of a low required torque TQD and engine speed N in FIG. 27, the operation of the internal combustion engine 1 is stopped and the vehicle is driven just by the motor/generator 70. That is, when the motor/generator 70 is made to rotate, the ring gear 74 is made to rotate, the rotational force of the ring gear 74 is transmitted to the output shaft 80 through the belt 79, and the vehicle is made to be driven by this. On the other hand, the planetary gear 76 does not rotate, so if the ring gear 74 rotates, the sun gear 73 is made to rotate. At this time, the motor/generator 71 idles.

On the other hand, in the high-speed high-load operating region H of a high required torque TQD or engine speed N in FIG. 27, the vehicle is driven by the drive power of the internal combustion engine 1 and the drive power of the motor/generator 70. That is, the rotational force of the planetary gear 76 is superposed on the rotational force of the ring gear 74. On the other hand, at this time, the motor/generator 71 generates electric power. Note that at this time, in actuality, the output of the internal combustion engine 1 is controlled so that the required torque is applied to the output shaft 80 and control is performed so that the motor/generator 70 is driven by the electric power generated by the motor/generator 71, but the explanation of the method of control at this time will be omitted here.

Next, referring to FIG. 28, an explanation will be given of the warmup control performed at FIG. 9, FIG. 12, FIG. 14, and FIG. 16 when using the electric power device shown in FIG. 26.

Figure 28:
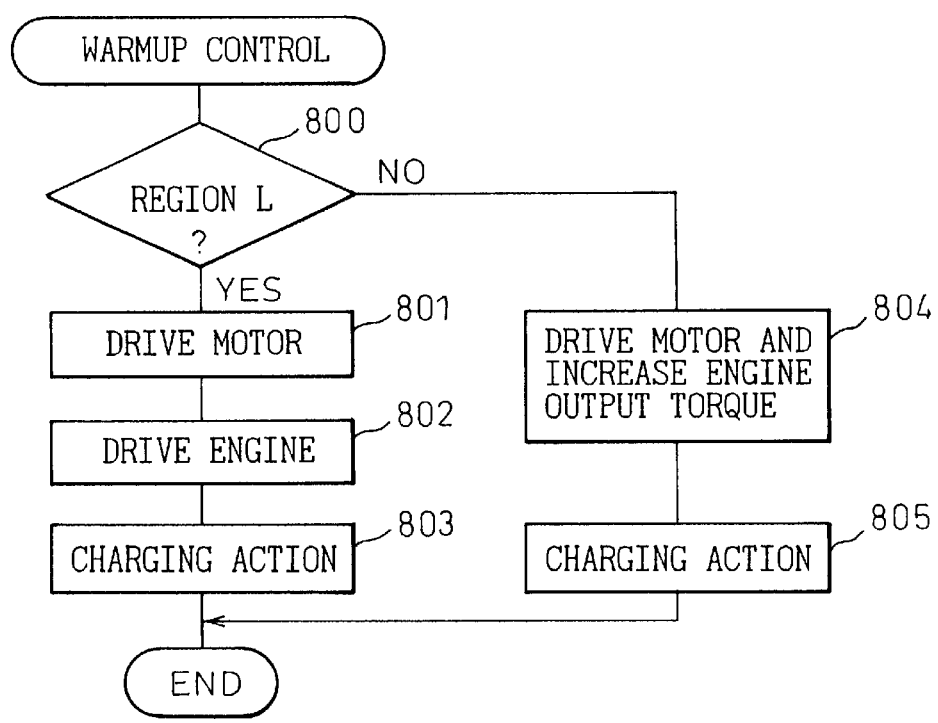
FIG. 28 is a flow chart for execution of warmup control.

Referring to FIG. 28, first, at step 800, it is judged if the required torque TQD and the engine speed N before the particulate filter 24 finishes being warmed up at the time of engine startup are in the operating region L of FIG. 27. When in the operating region L, the routine proceeds to step 801, where the motor/generator 70 is driven to rotate and the vehicle is driven by only the output of the motor/generator 70. Next, at step 802, the internal combustion engine 1 is operated at a high output. Next, at step 803, the output produced by the internal combustion engine 1 is consumed for the power generating action of the motor/generator 71. At this time, the particulate filter 24 is rapidly warmed up by the high output operation of the engine 1.

On the other hand, when it is judged at step 800 that the operating state is not the operating region L of FIG. 27, that is, when it is the operating region H, the routine proceeds to step 804, where the vehicle is driven by the drive power of the motor/generator 70 and the drive power of the internal combustion engine 1. At this time, however. The output torque of the engine 1 is made to increase from the output torque required for driving the vehicle and the amount of increase of the output torque is consumed by the power generating action of the motor/generator 71. Therefore, at this time as well, the warmup of the particulate filter 24 is promoted.

Note that after warmup is completed, when the engine operating state is not in the continuous oxidation removal region GG and I shown in FIG. 6 and FIG. 7, the output of the internal combustion engine 1, the drive power of the motor/generator 70, and the power generating action of the motor/generator 71 are controlled so that the engine operating state becomes the continuous oxidation removal region GG and I.

Now, as explained above, in the embodiments of the present invention, a layer of a carrier comprised of for example alumina is formed on the peripheral wall surfaces of the exhaust gas inflow passages 60 and the exhaust gas outflow passages 61, that is, the two side surfaces of the partitions 64 and the inner wall surfaces of the fine holes in the partitions 64. Platinum Pt or another precious metal catalyst is carried on this carrier. In this case, in addition to the platinum Pt etc., it is possible to carry on the carrier an active oxygen release agent taking in oxygen and holding the oxygen when there is excess oxygen present in the surroundings and releasing the held oxygen in the form of active oxygen when the concentration of oxygen in the surroundings falls. As the active oxygen release agent, it is possible to use at least one element selected from alkali metals such as potassium K, sodium Na, lithium Li, cesium Cs, and rubidium Rb, alkali earth metals such as barium Ba, calcium Ca, and strontium Sr, rare earths such as lanthanum La, yttrium Y, and cerium Ce, and transition metals.

Note that as the active oxygen release agent in this case, it is preferable to use an alkali metal or alkali earth metal having a higher ionization tendency than even calcium Ca, that is, potassium K, lithium Li, cesium Cs, rubidium Rb, barium Ba, or strontium Sr.

Next, the action of removal of particulate by oxidation in the case of using such an active oxygen release agent will be explained taking as an example the case of carrying platinum Pt and potassium K on a carrier, but a similar action of removal of particulate by oxidation is performed even if using another precious metal, alkali metal, alkali earth metal, rare earth, or transition metal.

In a compression-ignition type internal combustion engine as shown in FIG. 1 and FIG. 3, combustion is performed under an excess of air. Therefore, the exhaust gas contains a large amount of excess air. That is, if the ratio between the air and fuel fed into the intake passage, combustion chamber 5, and exhaust passage is called the "air-fuel ratio of the exhaust gas", in the compression-ignition type internal combustion engine shown in FIG. 1 and FIG. 3, the airfuel ratio of the exhaust gas becomes lean. Further, in the combustion chamber 5, NO is produced, so the exhaust gas contains NO. Therefore, exhaust gas containing excess oxygen and $NO_2$ flows into the exhaust gas inflow passage 60 of the particulate filter 24.

FIGS. 29A and 29B schematically show enlarged views of the surface of the carrier layer formed on the inner peripheral surface of the exhaust gas inflow passages 60 and the inner wall surface of the fine holes in the partitions 64. Note that in FIGS. 29A and 29B, 90 shows particulate of platinum Pt, while 91 shows an active oxygen release agent containing potassium K.

As explained above, since the exhaust gas contains a large amount of excess oxygen, if the exhaust gas flows into the exhaust gas inflow passages 60 of the particulate filter 24, as shown in FIG. 29A, the oxygen $O_2$ deposits on the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO+O_2 \rightarrow 2NO_2$). Next, part of the $NO_2$ produced is absorbed in the $NO_x$ absorbent 91 while being oxidized on the platinum Pt. It diffuses in the $NO_x$ absorbent 91 in the form of nitrate ions $NO_3^-$ as shown in FIG. 29A while bonding with the potassium K. Part of the nitrate ions $NO_3^-$ produce potassium nitrate $KNO_3$.

On the other hand, in the combustion chamber 5, particulate comprised mainly of carbon C, that is, soot, is produced. Therefore, the exhaust gas contains this particulate. The particulate contacts and deposits on the surface of the carrier layer, for example, the surface of the active oxygen release agent 91, as shown by 92 in FIG. 29B when the exhaust gas flows inside the exhaust gas inflow passage 60 of the particulate filter 24 or heads from the exhaust gas inflow passages 60 to the exhaust gas outflow passages 61.

If the particulate 92 deposits on the surface of the active oxygen release agent 91 in this way, the concentration of oxygen falls at the contact surfaces between the particulate 92 and the active oxygen release agent 91. If the concentration of oxygen falls, a difference in concentration occurs with the inside of the high oxygen concentration active oxygen release agent 91 and therefore the oxygen in the active oxygen release agent 91 tries to move toward the contact surfaces between the particulate 92 and the active oxygen release agent 91. As a result, the potassium nitrate $KNO_3$ formed in the active oxygen release agent 91 is broken down into potassium K and oxygen O and NO, the oxygen O heads toward the contact surfaces of the particulate 92 and active oxygen release agent 91, and the NO is released to the outside from the active oxygen release agent 91. The NO released to the outside is oxidized on the downstream side platinum Pt and again absorbed in the active oxygen release agent 91.

The oxygen, however, heading toward the contact surface between the particulate 92 and the active oxygen release agent 91 is oxygen broken down from a compound such as potassium nitrate $KNO_3$. Oxygen O broken down from a compound has a high energy and has an extremely high activity. Therefore, the oxygen heading toward the contact surfaces between the particulate 92 and the active oxygen release agent 91 becomes the active oxygen O. If this active oxygen O contacts the particulate 92, the particulate 92 is made to oxidize in a short time without emitting a luminous flame. It is possible to promote the oxidation action of the deposited particulate by carrying the active oxygen release agent 91 on the carrier in this way. Note that the particulate 92 deposited on the particulate filter 24 in this way is made to oxidize by the active oxygen O, but the particulate 92 is also made to oxidize by the oxygen in the exhaust gas.

Further, in this embodiment according to the present invention, the carrier may carry, in addition to the platinum Pt or other precious metal catalyst, an $NO_x$ absorbent which absorbs the $NO_x$ contained in the exhaust gas when the air-fuel ratio of the exhaust gas flowing into the particulate filter 24 is lean and releases the absorbed $NO_x$ when the air-fuel ratio of the exhaust gas flowing into the particulate filter 24 becomes the stoichiometric air-fuel ratio or rich. In this case, as the $NO_x$ absorbent, it is possible to use at least one element selected from alkali metals such as potassium K, sodium Na, lithium Li, cesium Cs, and rubidium Rb, alkali earth metals such as barium Ba, calcium Ca, and strontium Sr, and rare earths such as lanthanum La, yttrium Y, and cesium Ce. Note that as will be understood from a comparison with the metals making up the above-mentioned oxygen release agent, the metals making up the $NO_x$ absorbent and the metals making up the active oxygen release agent match in large part.

In this case, it is possible to use different metals as the $NO_x$ absorbent and the active oxygen release agent and possible to use the same metals. When using the same metal as the $NO_x$ absorbent and active oxygen release agent, both the functions of the function as an $NO_x$ absorbent and the function as an active oxygen release agent are simultaneously performed.

Next, the $NO_x$ absorbing/releasing action will be explained taking as an example the case of using platinum Pt as the precious metal catalyst and using potassium K as the $NO_x$ absorbent.

First, considering the action of absorption of $NO_x$, $NO_x$ is absorbed in the $NO_x$ absorbent by the same mechanism as the mechanism shown in FIG. 29A. In this case, however, reference numeral 91 in FIG. 29A shows the $NO_x$ absorbent.

That is, when the air-fuel ratio of the exhaust gas flowing into the particulate filter 24 is lean, the exhaust gas contains a large amount of excess oxygen, so when the exhaust gas flows into the exhaust gas inflow passage 60 of the particulate filter 24, as shown in FIG. 29A, the oxygen $O_2$ deposits on the surface of the platinum Pt in the form of $O_2^-$ or $O_2^-$. On the other hand, the NO in the exhaust gas reacts with the $O_2^-$ or $O^{2-}$ on the surface of the platinum Pt to become $NO_2$ ($2NO+O_2 \rightarrow 2NO_2$). Next, part of the $NO_2$ produced is absorbed in the $NO_x$ absorbent 91 while being oxidized on the platinum Pt. It diffuses in the $NO_x$ absorbent 91 in the form of nitrate ions $NO_3^-$ as shown in FIG. 29A while bonding with the potassium K. Part of the nitrate ions $NO_3^-$ produce potassium nitrate $KNO_3$. In this way, NO is absorbed in the $NO_x$ absorbent 91.

On the other hand, when the exhaust gas flowing into the particulate filter 24 becomes rich, the nitrate ions $NO_3^-$ break down into oxygen O and NO, and NO is successively released from the $NO_x$ absorbent 91. Therefore, if the air-fuel ratio of the exhaust gas flowing into the particulate filter 24 becomes rich, the NO is released from the $NO_x$ absorbent 91 in a short time. Further, the released NO is decreased, so NO is not discharged into the atmosphere.

Note that in this case, even if the air-fuel ratio of the exhaust gas flowing into the particulate filter 24 is made the stoichiometric air-fuel ratio, NO is released from the $NO_x$ absorbent 91. In this case, however, since the NO is only released gradually from the $NO_x$ absorbent 91, it takes a somewhat long time to cause all of the $NO_x$ absorbed in the $NO_x$ absorbent 91 to be released.

Note that, as explained above, it is possible to use the same metal as the $NO_x$ absorbent and the active oxygen release agent. In this case, as explained above, both the functions of the function as the $NO_x$ absorbent and the function as the active oxygen release agent are simultaneously performed. The agent simultaneously performing these two functions will be called an "active oxygen release agent/$NO_x$ absorbent" below. In this case, reference numeral 91 in FIG. 29A shows the active oxygen release agent/$NO_x$ absorbent.

When using this active oxygen release agent/$NO_x$ absorbent 91, when the air-fuel ratio of the exhaust gas flowing into the particulate filter 24 is lean, the NO contained in the exhaust gas is absorbed in the active oxygen release agent/$NO_x$ absorbent 91. When the particulate contained in the exhaust gas deposits on the active oxygen release agent/$NO_x$ absorbent 91, the particulate is made to be removed by oxidation in a short time by the active oxygen contained in the exhaust gas and the active oxygen released from the active oxygen release agent/$NO_x$ absorbent 91. Therefore, at this time, it is possible to prevent both the particulate and $NO_x$ in the exhaust gas from being discharged into the atmosphere.

On the other hand, if the air-fuel ratio of the exhaust gas flowing into the particulate filter 24 becomes rich, NO is discharged from the active oxygen release agent/$NO_x$ absorbent 91. This NO is decreased by the unburnt HC and CO. Therefore, at this time as well, NO is not discharged into the atmosphere. Further, the oxidation action of the deposited particulate on the particulate filter 24 is promoted by the active oxygen released from the active oxygen release agent/$NO_x$ absorbent 91.

Figure 30:
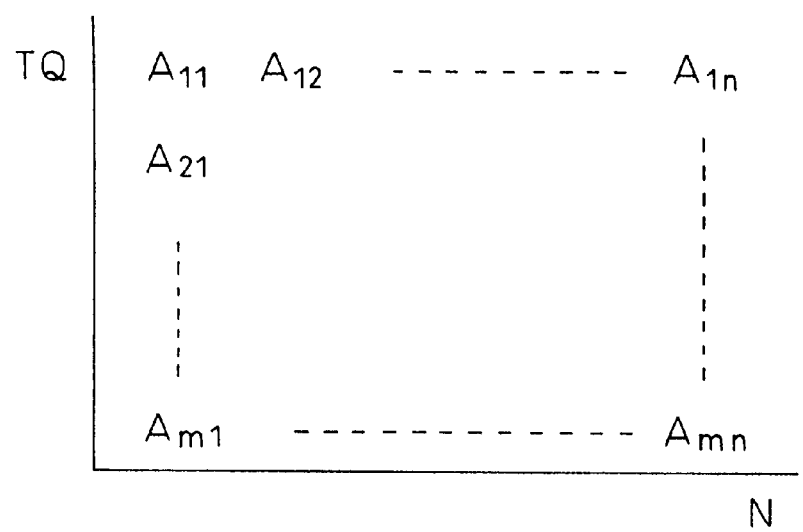
FIG. 30 is a view of a map of amount of absorption of $NO_x$.

Now, as explained above, the $NO_x$ is absorbed in the $NO_x$ absorbent 91 or the active oxygen release agent/$NO_x$ absorbent 91 (hereinafter these being referred to all together as simply the "$NO_x$ absorbent 91"). There is however a limit to the $NO_x$ absorption ability of the $NO_x$ absorbent 91. It is necessary to cause the $NO_x$ to be released from the $NO_x$ absorbent 91 before the $NO_x$ absorption ability of the $NO_x$ absorbent 91 becomes saturated. Therefore, it is necessary to estimate the amount of $NO_x$ absorbed in the $NO_x$ absorbent 91. Thus, when carrying the $NO_x$ absorbent 91 on a carrier of the particulate filter 24 in the first embodiment to fifth embodiment explained up to here, the amount A of absorption of $NO_x$ per unit time is found in advance as a function of the required torque TQ and the engine speed N in the form of a map as shown in FIG. 30, and the amount A of absorption of $NO_x$ per unit time is cumulatively added, whereby the $NO_x$ amount $\Sigma NOX$ absorbed in the $NO_x$ absorbent 91 is estimated.

Further, in these embodiments, when the $NO_x$ absorption amount $\Sigma NOX$ exceeds the predetermined allowable maximum value MAXN, the air-fuel ratio of the exhaust gas flowing into the particulate filter 24 is made temporarily rich and thereby $NO_x$ is released from the $NO_x$ absorbent 91.

Note that the exhaust gas contains $SO_x$. The $NO_x$ absorbent 91 absorbs not only the $NO_x$, but also $SO_x$. The mechanism of absorption of $SO_x$ in the $NO_x$ absorbent 91 is believed to be the same as the mechanism of absorption of the $NO_x$.

That is, in the same way as the explanation of the $NO_x$ absorption mechanism, explaining this taking as an example the case of carrying platinum Pt and potassium K on the carrier, as explained above, when the air-fuel ratio of the exhaust gas is lean, oxygen $O_2$ deposits on the surface of the platinum Pt in the form of $O_2^-$ or $O^{2-}$. On the other hand, the $SO_2$ in the exhaust gas reacts with the $O_2^-$ or $O^{2-}$ on the surface of the platinum Pt to become $SO_3$. Next, part of the $SO_3$ produced is absorbed in the $NO_x$ absorbent while being further oxidized on the platinum Pt. It diffuses in the $NO_x$ absorbent 91 in the form of sulfate ions $SO_4^{2-}$ while bonding with the potassium K to produce stable sulfate $K_2SO_4$.

This sulfate $K_2SO_4$, however, is stable and difficult to break down. If the air-fuel ratio of the exhaust gas is just made rich, the sulfate $K_2SO_4$ remains as it is without breaking down. Therefore, the sulfate $K_2SO_4$ increases in the $NO_x$ absorbent 91 along with the elapse of time and therefore, along with the elapse of time, the amount of $NO_x$ which the $NO_x$ absorbent 91 can absorb falls.

Note that this sulfate $K_2SO_4$ decomposes when the temperature of the $NO_x$ absorbent 91 exceeds a constant temperature determined by the $NO_x$ absorbent 91, for example, about 600° C. At this time, if the air-fuel ratio of the exhaust gas flowing into the $NO_x$ absorbent 91 is made rich, $SO_x$ is released from the $NO_x$ absorbent 91. However, releasing the $SO_x$ from the $NO_x$ absorbent 91 takes considerable time compared with releasing $NO_x$ from the $NO_x$ absorbent 91.

Therefore, when $SO_x$ is to be released from the $NO_x$ absorbent 91, hydrocarbon, for example, fuel, is injected from the hydrocarbon feed valve 42 so that the air-fuel ratio of the exhaust gas becomes rich. When fuel is injected from the hydrocarbon feed valve 42, the temperature of the $NO_x$ absorbent 91 rises due to the heat of combustion of the fuel and therefore $SO_x$ is released from the $NO_x$ absorbent 91.

Next, referring to FIG. 31, the processing routine for an $NO_x$ release flag to be set when $NO_x$ is to be released from the $NO_x$ absorbent 91 and an $SO_x$ release flag to be set when $SO_x$ is to be released from the $NO_x$ absorbent 91 will be explained. Note that this routine is executed by interruption every predetermined time.

Figure 31:
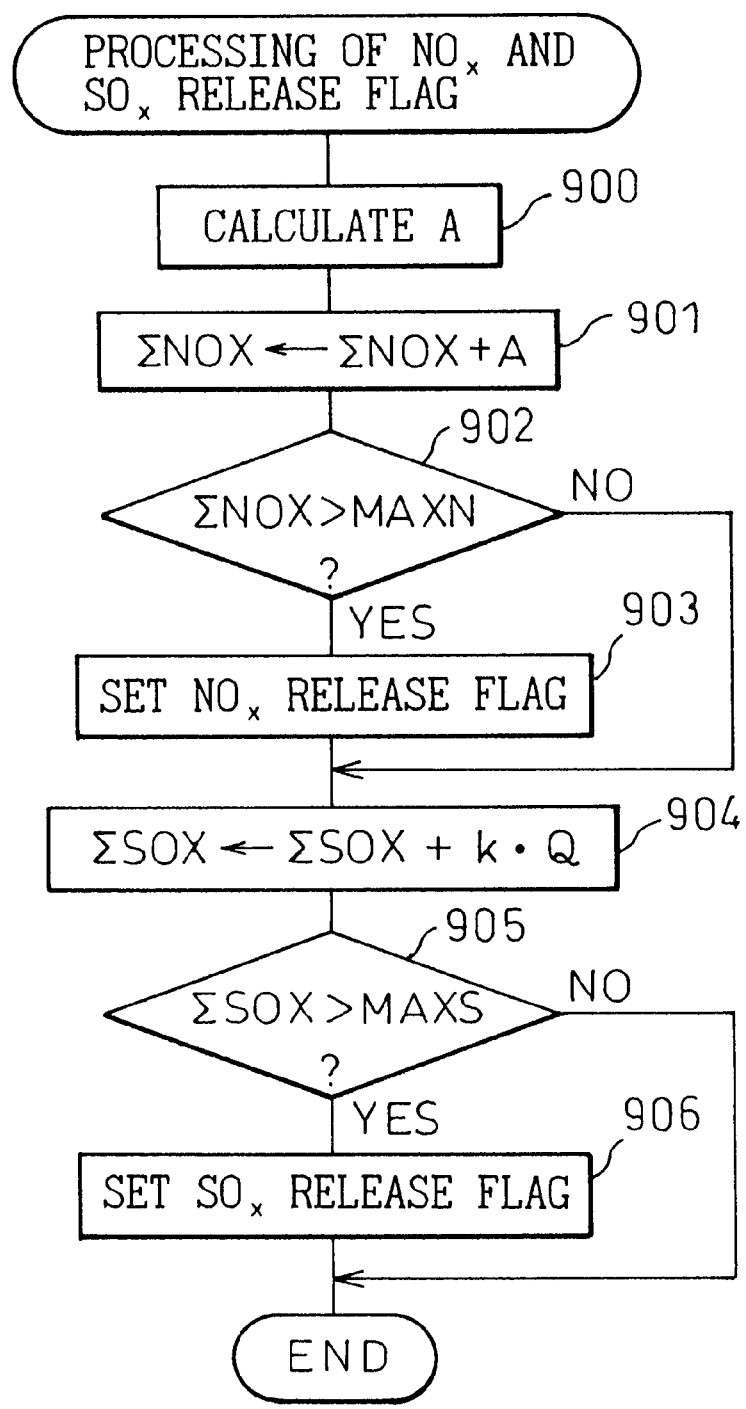
FIG. 31 is a flow chart for processing of an $NO_x$ and $SO_x$ release flag.

Referring to FIG. 31, first, at step 900, the amount A of $NO_x$ absorbed per unit time is calculated from the map shown in FIG. 30. Next, at step 901, A is added to the $NO_x$ absorbed amount $\Sigma NOX$. Next, at step 902, it is judged if the $NO_x$ absorbed amount $\Sigma NOX$ has exceeded the allowable maximum value MAXN. When $\Sigma NOX > MAXN$, the routine proceeds to step 903, where an $NO_x$ release flag showing that the $NO_x$ is to be released is set. Next, the routine proceeds to step 904.

At step 904, the product k·Q of the amount Q of injection and the constant k is added to $\Sigma SOX$. Fuel contains a substantially constant amount of sulfur S. Therefore, the amount of $SO_x$ absorbed in the $NO_x$ absorbent 91 can be expressed by k·Q. Therefore, the $\Sigma SOX$ obtained by successively adding this k·Q expresses the amount of $SO_x$ estimated to be absorbed in the $NO_x$ absorbent 91. At step 905, it is judged if this $SO_x$ amount $\Sigma SOX$ has exceeded the allowable maximum value MAXS. When $\Sigma SOX > MAXS$, the routine proceeds to step 906, where the $SO_x$ release flag is set.

Next, the $NO_x$ and $SO_x$ release processing routine will be explained with reference to FIG. 32.

Figure 32:
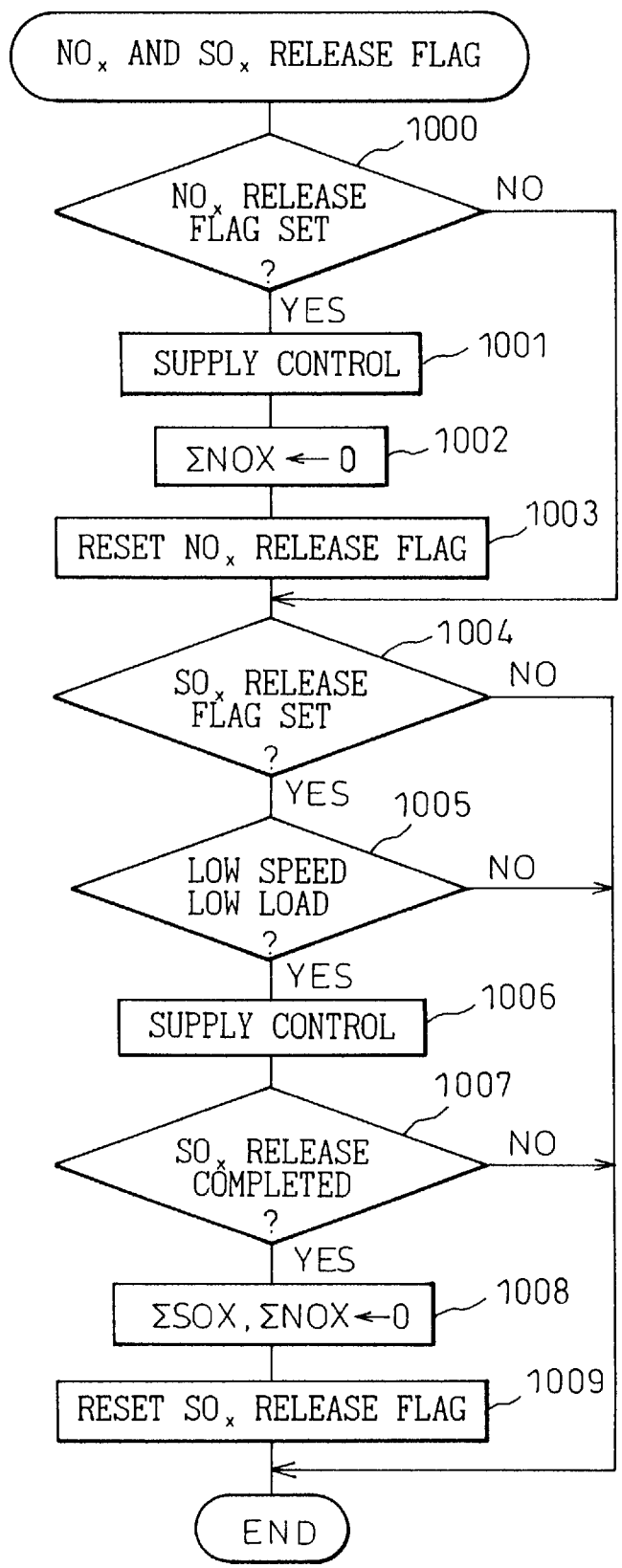
FIG. 32 is a flow chart for execution of $NO_x$ and $SO_x$ release processing.

Referring to FIG. 32, first, at step 1000, it is judged if the $NO_x$ release flag has been set or not. When the $NO_x$ release flag has been set, the routine proceeds to step 1001, where fuel is supplied from the hydrocarbon feed valve 42 for a predetermined time so that the air-fuel ratio of the exhaust gas becomes rich. At this time, $NO_x$ is released from the $NO_x$ absorbent. Next, at step 1002, $\Sigma NOX$ is cleared, then at step 1003, the $NO_x$ release flag is reset.

Next, at step 1004, it is judged if the $SO_x$ release flag is set or not. When the $SO_x$ release flag is set, the routine proceeds to step 1005, where it is judged if the engine is in low-speed low-load operation. When in a low-speed low-load operation, the routine proceeds to step 1006, where fuel is supplied from the hydrocarbon feed valve 42 over a time longer than the $NO_x$ release time so that the air-fuel ratio of the exhaust gas becomes rich. The amount of fuel required for making the air-fuel ratio of the exhaust gas rich becomes smaller the lower the engine speed and becomes smaller the lower the engine load. Therefore, fuel is made to be fed from the hydrocarbon feed valve 42 at the time of engine low-speed low-load operation.

Next, at step 1007, it is judged if the $SO_x$ has finished being released from the $NO_x$ absorbent 91. when it is judged that the $SO_x$ has finished being released, the routine proceeds to step 1008, where $\Sigma SOX$ and $\Sigma NOX$ are cleared, then at step 1009, the $SO_x$ release flag is reset.

Note that it is also possible to perform low temperature combustion when $NO_2$ or $SO_3$ should be released from the $NO_x$ absorbent 91 and make the air-fuel ratio in the combustion chamber 5 rich under this low temperature combustion.

As mentioned above, according to the present invention, it is possible to continuously remove particulate deposited on a particulate filter by oxidation.

While the invention has been described with reference to specific embodiments chosen for purpose of illustration, it should be apparent that numerous modifications could be made thereto by those skilled in the art without departing from the basic concept and scope of the invention.

What is claimed is:

1. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein an electric power device able to generate vehicle drive power separate from the vehicle drive power of the engine and able to generate electric power from the engine is provided and a battery for supplying electric power for driving the vehicle to the electric power device and for being charged by the electric power generated by the electric power device is provided; and, after the particulate filter finishes being warmed up at the time of engine startup, when the temperature of the particulate filter falls below a temperature at which deposited particulate can be continuously removed by oxidation, an output torque of the engine is increased from a required torque so that the temperature of the particulate filter becomes a temperature at which deposited particulate can be continuously removed by oxidation and the amount of increase in output torque is consumed for the power generating action by the electric power device.

2. An exhaust gas purification device as set forth in claim 1, wherein before the particulate filter finishes being warmed up at the time of engine startup, the output torque of the engine is increased from the required torque and the amount of increase in output torque is consumed for the power generating action by the electric power device.

3. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein an electric power device able to generate vehicle drive power separate from the vehicle drive power of the engine and able to generate electric power from the engine is provided and a battery for supplying electric power for driving the vehicle to the electric power device and for being charged by the electric power generated by the electric power device is provided; and, after the particulate filter finishes being warmed up at the time of engine startup, when the amount of exhausted particulate is greater than an amount of exhausted particulate at which the deposited particulate can be continuously removed by oxidation, an output torque of the engine is decreased from a required torque so that the amount of exhausted particulate becomes an amount at which the deposited particulate can be continuously removed by oxidation and the amount of decrease in output torque is compensated for by the vehicle drive power from the electric power device.

4. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein after the particulate filter finishes being warmed up at the time of engine startup, at the time of steady engine operation, a continuous oxidation removal region of deposited particulate is formed in a limited partial operating region of the operating region of the engine; an electric power device able to generate vehicle drive power separate from the vehicle drive power of the engine and able to generate electric power from the engine is provided and a battery for supplying electric power for driving the vehicle to the electric power device and for being charged by the electric power generated by the electric power device is provided; and, after the particulate filter finishes being warmed up at the time of engine startup, when the output torque of the engine is lower than an output torque of said limited partial operating region, the output torque of the engine is increased from the required torque so that the output torque of the engine becomes the output torque of the limited partial operating region and the amount of increase in output torque is consumed for the power generating action of the electric power device.

5. An exhaust gas purification device as set forth in claim 4, wherein before the particulate filter finishes being warmed up at the time of engine startup, the output torque of the engine is increased from the required torque and the amount of increase in output torque is consumed for the power generating action by the electric power device.

6. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein after the particulate filter finishes being warmed up at the time of engine startup, at the time of steady engine operation, a continuous oxidation removal region of deposited particulate is formed in a limited partial operating region of the operating region of the engine; an electric power device able to generate vehicle drive power separate from the vehicle drive power of the engine and able to generate electric power from the engine is provided and a battery for supplying electric power for driving the vehicle to the electric power device and for being charged by the electric power generated by the electric power device is provided; and, after the particulate filter finishes being warmed up at the time of engine startup, when the output torque of the engine is higher than an output torque of said limited partial operating region, the output torque of the engine is decreased from the required torque so that the output torque of the engine becomes the output torque of the limited partial operating region and the amount of decrease in output torque is compensated for by the vehicle drive power of the electric power device.

7. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, and estimating means for estimating the amount of deposited particulate on the particulate filter is provided; when it is estimated by the estimating means that the amount of deposited particulate on the particulate filter has exceeded a predetermined allowable amount, when the temperature of the particulate filter is lower than a temperature at which the deposited particulate can be continuously removed by oxidation, the output torque of the engine is increased from the required torque so that the temperature of the particulate filter becomes a temperature at which the deposited particulate can be continuously removed by oxidation and the amount of increase of the output torque is consumed by the power generating action of the electric power device.

8. An exhaust gas purification device as set forth in claim 7, wherein further provision is made of a detecting means for detecting a pressure loss at the particulate filter and wherein said estimating means estimates that the amount of deposited particulate on the particulate filter has exceeded the allowable amount when said pressure loss has exceeded a set value.

9. An exhaust gas purification device as set forth in claim 7, wherein further provision is made of a calculating means for calculating the amount of deposited particulate on the particulate filter based on the temperature of the particulate filter and an amount of exhausted particulate from the engine and wherein said estimating means estimates that the amount of deposited particulate on the particulate filter has exceeded the allowable value when the amount of deposited particulate calculated by said calculating means has exceeded an allowable amount.

10. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, and estimating means for estimating the amount of deposited particulate on the particulate filter is provided; when it is estimated by the estimating means that the amount of deposited particulate on the particulate filter has exceeded a predetermined allowable amount, when the amount of the exhausted particulate is larger than an amount of exhausted particulate at which the deposited particulate can be continuously removed by oxidation, the output torque of the engine is decreased from the required torque so that the amount of exhausted particulate becomes an amount at which the deposited particulate can be continuously removed by oxidation and the amount of decrease of the output torque is compensated for by the vehicle drive power of the electric power device.

11. An exhaust gas purification device as set forth in claim 10, wherein further provision is made of a detecting means for detecting a pressure loss at the particulate filter and wherein said estimating means estimates that the amount of deposited particulate on the particulate filter has exceeded the allowable amount when said pressure loss has exceeded a set value.

12. An exhaust gas purification device as set forth in claim 10, wherein further provision is made of a calculating means for calculating the amount of deposited particulate on the particulate filter based on the temperature of the particulate filter and an amount of exhausted particulate from the engine and wherein said estimating means estimates that the amount of deposited particulate on the particulate filter has exceeded an allowable value when the amount of deposited particulate calculated by said calculating means has exceeded an allowable amount.

13. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein said internal combustion engine is an internal combustion engine where when an amount of inert gas in the combustion chamber increases, the amount of production of soot gradually increases and then peaks and where when further increasing the amount of inert gas in the combustion chamber, a temperature of the fuel and its surrounding gas at the time of combustion in the combustion chamber becomes lower than the temperature of production of soot and soot is no longer produced much at all; an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, estimating means for estimating the amount of deposited particulate on the particulate filter is provided, and switching means is provided for selectively switching between a first combustion where an amount of inert gas in the combustion chamber is larger than an amount of inert gas at which the amount of production of soot peaks and a second combustion where an amount of inert gas in the combustion chamber is smaller than the amount of inert gas at which the amount of production of soot peaks; and after the particulate filter finishes being warmed up, when it is estimated by the estimating means that the amount of deposited particulate on the particulate filter has exceeded a predetermined allowable amount, the second combustion is switched to the first combustion by said switching means and a torque difference between the engine output torque and the required torque is adjusted by the electric power device so that the required torque is given to the vehicle.

14. An exhaust gas purification device as set forth in claim 13, wherein first combustion is performed before the particulate filter finishes being warmed up at the time of engine startup and the torque difference between the output torque of the engine and the required torque is adjusted by the electric power device so that the required torque is given to the vehicle.

15. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein said internal combustion engine is an internal combustion engine where when an amount of inert gas in the combustion chamber increases, the amount of production of soot gradually increases and then peaks and where when further increasing the amount of inert gas in the combustion chamber, a temperature of the fuel and its surrounding gas at the time of combustion in the combustion chamber becomes lower than the temperature of production of soot and soot is no longer produced much at all; an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, and switching means is provided for selectively switching between a first combustion where an amount of inert gas in the combustion chamber is larger than an amount of inert gas at which the amount of production of soot peaks and a second combustion where an amount of inert gas in the combustion chamber is smaller than the amount of inert gas at which the amount of production of soot peaks; and when a temperature of the particulate filter is lower than a temperature at which the deposited particulate can be continuously removed by oxidation and a representative value of charging expressing an amount of charging of the battery is lower than a set representative value, the output torque of the engine is increased from the required torque under said second combustion and the amount of increase of the output torque is consumed for the power generating action of the electric power device.

16. An exhaust gas purification device as set forth in claim 15, wherein when the representative value of charging exceeds said set representative value, the second combustion is switched to the first combustion and the amount of decrease of the output torque is compensated for by the vehicle drive power of the electric power device.

17. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein said internal combustion engine is an internal combustion engine where when an amount of inert gas in the combustion chamber increases, the amount of production of soot gradually increases and then peaks and where when further increasing the amount of inert gas in the combustion chamber, a temperature of the fuel and its surrounding gas at the time of combustion in the combustion chamber becomes lower than the temperature of production of soot and soot is no longer produced much at all; an electric power device able to generate vehicle drive power separate from the vehicle drive power of the engine and able to generate electric power from the engine is provided, a battery for supplying electric power for driving the vehicle to the electric power device and for being charged by the electric power generated by the electric power device is provided, and switching means is provided for selectively switching between a first combustion where an amount of inert gas in the combustion chamber is larger than an amount of inert gas at which the amount of production of soot peaks and a second combustion where an amount of inert gas in the combustion chamber is smaller than the amount of inert gas at which the amount of production of soot peaks; when an amount of exhausted particulate is larger than an amount at which deposited particulate can be continuously removed by oxidation, the output torque of the engine is decreased from the required torque under the second combustion and the amount of decrease of the output torque is compensated for by the vehicle drive power of the electric power device; while when a temperature of the particulate filter becomes lower than the temperature at which the deposited particulate can be continuously removed by oxidation, the second combustion is switched to the first combustion and a torque difference between the output torque of the engine and the required torque is adjusted by the electric power device so that a required torque is given to the vehicle.

18. An exhaust gas purification device of an internal combustion engine in which a particulate filter for trapping particulate in an exhaust gas is arranged in an engine exhaust passage, deposited particulate on the particulate filter can be continuously removed by oxidation without being accompanied by occurrence of a luminous flame when performing continuous combustion under a lean air-flow ratio, and a continuous oxidation removal region of the deposited particulate is determined by a temperature of the particulate filter and an amount of exhausted particulate exhausted from the engine, wherein said device comprises an $NO_x$ absorbent which is carried on the particulate filter, absorbs $NO_x$ when an air-fuel ratio of inflowing exhaust gas is lean, and releases the absorbed $NO_x$ when the air-fuel ratio of the inflowing exhaust gas is rich or the stoichiometric air-fuel ratio, an electric power device able to generate vehicle drive power separate from the vehicle drive power of the engine and able to generate electric power from the engine, and a battery for supplying electric power for driving the vehicle to the electric power device and for being charged by the electric power generated by the electric power device; after the particulate filter finishes being warmed up, when the temperature of the particulate filter falls below a temperature at which the deposited particulate can be continuously removed by oxidation, the output torque of the engine is increased from the required torque so that the temperature of the particulate filter becomes a temperature at which the deposited particulate can be continuously removed by oxidation and the amount of increase of the output torque is consumed for the power generating action of the electric power device; and, when $NO_x$ or $SO_x$ should be released from the $NO_x$ absorbent, the air-fuel ratio of the exhaust gas flowing into the $NO_x$ absorbent is temporarily changed from lean to rich.

\* \* \* \* \*